US007016552B2

(12) United States Patent
Koyama

(10) Patent No.: US 7,016,552 B2
(45) Date of Patent: Mar. 21, 2006

(54) IMAGE PROCESSING DEVICE, IMAGE PROCESSING METHOD, AND RECORDING MEDIUM STORING IMAGE PROCESSING PROGRAM

(75) Inventor: Toshiya Koyama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 869 days.

(21) Appl. No.: 09/945,806

(22) Filed: Sep. 5, 2001

(65) Prior Publication Data

US 2002/0028027 A1 Mar. 7, 2002

(30) Foreign Application Priority Data

Sep. 7, 2000 (JP) ............................ 2000-271212

(51) Int. Cl.
*G06K 9/36* (2006.01)

(52) U.S. Cl. ...................................... 382/289; 382/281

(58) Field of Classification Search ................ 382/289, 382/281, 256
See application file for complete search history.

(56) References Cited

U.S. PATENT DOCUMENTS 5,054,098 A * 10/1991 Lee ............................ 382/289
5,181,260 A * 1/1993 Kurosu et al. .............. 382/289

FOREIGN PATENT DOCUMENTS

JP 2-170280 A 7/1990
JP 6-203202 A 7/1994
JP 11-73503 A 3/1999
JP 11-328408 A 11/1999

OTHER PUBLICATIONS

Baxes, Gregory A., Digital Image Processing, 1994, John Wiley & Sons, Inc., ISBN 0-471-00949-0, (p. 136).*
Gonzalez, Rafael C., Woods, Richard E., Digital Image Processing, 1992, Addison-Wesley, Inc., ISBN 0-201-50803-6, (p. 663).*
Sun, Changming, Si, Deyi, Skew and Slant Correction for Document Images using Gradient Direction, Document Analysis and Recognition, 1997, (pp. 142-146).*

* cited by examiner

*Primary Examiner*—Kanjibhai Patel
*Assistant Examiner*—Sath V. Perungavoor
(74) *Attorney, Agent, or Firm*—Oliff & Berridge, PLC

(57) ABSTRACT

A Hough transform unit executes Hough transform to HIGH pixels of outline binary image data inputted thereto, and stores the calculation result in a Hough space data storage. A Hough space data calculating/projecting unit sequentially reads out data stored in the Hough space data storage, executes a specific calculation, and thereafter stores the calculation result sequentially in a calculated projection data storage. An angle detector sequentially reads out calculated frequency data stored in the calculated projection data storage, calculates the maximal value of the data read out, and detects an angle that gives the maximal value as the skew angle. The image processing device, being thus configured, allows detecting and correcting the skew angle with high accuracy, even when the input image contains image elements such as photograph images and dot images.

23 Claims, 29 Drawing Sheets

FIG. 5

| | | | | |
|---|---|---|---|---|
| A | B | C | D | E |
| F | G | H | I | J |
| K | L | X | M | N |
| O | P | Q | R | S |
| T | U | V | W | Y |

IMAGE PROCESSING DEVICE, IMAGE PROCESSING METHOD, AND RECORDING MEDIUM STORING IMAGE PROCESSING PROGRAM

BACKGROUND OF THE INVENTION

1. Field of the Invention

The present invention relates to an image processing device, an image processing method, and a recording medium containing an image processing program, specifically to an image processing device provided with the so-called skew correction function that detects a skew angle of a document image, for example, read by an image scanner, or received by a facsimile terminal, and corrects the skew angle of the image, a processing method of the same, and a recording medium that contains a program for executing the processing operations according to the processing method as software.

2. Discussion of the Related Art

An OCR (optical character recognition) has been known as an image processing device that cuts out an image region from a document image read by an image scanner, or received by a facsimile, and automatically discriminates the type or attribute of the image contained in the document, and executes character recognition to a region discriminated as a character region.

In this type of the image processing device, it is premised that the cutting-out of a region and the character recognition are executed correctly, and it is essential that the image is not inclined, that is, the image does not have a skew. If the image is read out or received in a state with a skew, the skew will have to be corrected.

Conventionally, several techniques have been proposed which perform the detection and correction of a skew. For example, Japanese Published Unexamined Patent Application No. Hei 2-170280 discloses a technique that, while varying an angle θ sequentially, rotates a document image by the angle θ, creates a circumscribed rectangle containing all the black pixels contained in the rotated image, and detects the angle θ as a skew angle that minimizes the area of the circumscribed rectangle. Hereunder, this is referred to as the first conventional technique.

Further, Japanese Published Unexamined Patent Application No. Hei 6-203202 discloses a technique that, while checking connectivity of black pixels contained in the image, creates circumscribed rectangles thereof, extracts only the circumscribed rectangle having a specific size, determines a histogram in which one vertex of the extracted circumscribed rectangle is projected in various orientations, and detects the angle that maximizes this histogram as the skew angle. Hereunder, this is referred to as the second conventional technique.

Further, Japanese Published Unexamined Patent Application No. Hei 11-328408 discloses a technique that adopts the Hough transform. Hereunder, this is referred to as the third conventional technique. The third conventional technique executes filtering to the input image to emphasize a concentration difference, and executes binarization to the emphasized image to create a binary image. Next, it executes the Hough transform to each of the pixels of the created binary image to create a histogram on the Hough space. Next, it extracts the coordinates at which the frequency exceeds a specific threshold on the Hough space, and groups the extracted coordinates. And, it extracts the coordinates of the representative points for each group, and estimates the skew of the image data from the extracted coordinates.

The above Patent Application further discloses the technique that also employs the Hough transform. Hereunder, this is referred to as the fourth conventional technique. The fourth conventional technique executes filtering to the input image to emphasize a concentration difference, and executes binarization to the emphasized image to create a binary image. Next, it executes the Hough transform to each of the pixels of the created binary image to create a histogram on the Hough space. Next, it extracts the coordinates at which the frequency exceeds a specific threshold on the Hough space. And, it integrates the number of the extracted coordinates by each angle to create a histogram, and defines the angle that gives the maximum frequency as the skew angle of the image data.

However, the first conventional technique needs to rotate the image by plural angles, and accordingly requires significant processing time, which is a disadvantage. Further, since it detects the skew angle from a circumscribed rectangle containing all the black pixels contained in the image, when the pixels located at the upper, lower, right, or left region leap out partially, an optimum circumscribed rectangle cannot be attained, and the skew angle cannot be detected correctly, which is a disadvantage.

Further, since the second conventional technique detects the skew angle from the projected histogram of a circumscribed rectangle vertex, when the document image is made up of a text region with multiple columns, and the lines between the multiple columns are dislocated, it cannot detect the skew angle correctly, which is a problem. In addition, basically the second conventional technique is intended for a character region, and it cannot detect the skew angle correctly if there are not many characters in the document image.

Further, the third and the fourth conventional techniques execute filtering processing to the input image to emphasize a concentration difference, execute binarization to the image with the concentration difference emphasized to create a binary image, and execute the Hough transform to the created binary image; and therefore, when the input image is made up of only the image elements such as characters, charts, diagrams since most of the ON (black) pixels of the binary image are made up of the outlines of the image elements, these techniques exhibit a comparably satisfactory performance.

However, when the input image contains image elements such as a picture image or a dot image, binarization will result in the picture image or the dot image containing the ON pixels, or it will turn the dots of the dot image into the ON pixels. When the Hough transform is applied to such a binary image, the processing time increases, or the detection accuracy of the skew angle detected in the Hough space decreases, which is disadvantageous.

SUMMARY OF THE INVENTION

The present invention has been made in view of the above circumstances of the conventional techniques, and provides an image processing device that permits high-accuracy detection and correction of the skew angle regardless of the types of the input images, a processing method of the same, and a recording medium that contains an image processing program for executing the processing operations according the processing method.

The image processing device relating to the present invention is provided with a binary image generating part that generates binary image data from inputted image data, and a skew angle detecting part that calculates a skew angle of the image data inputted by an input unit from the binary image data generated by the binary image generating part. And, the skew angle detecting unit includes a Hough transform part that executes Hough transform to the binary image data generated by the binary image generating part to generate Hough space data, a frequency calculating part that executes a specific calculation to each of frequencies of data from the Hough space data generated by the Hough transform part, and adds an attained calculation result by each angle to generate frequency calculation data, and an angle detecting part that calculates an angle from the frequency calculation data generated by the frequency calculating part.

The image processing method relating to the present invention executes, when generating binary image data from inputted image data, and detecting a skew angle of the inputted image data from the binary image data generated, the processing of a Hough transform step that executes Hough transform to the binary image data generated to generate Hough space data, a frequency calculating step that executes a specific calculation to each of frequencies of data from the Hough space data generated by the Hough transform step, and adds an attained calculation result by each angle to generate frequency calculation data, and an angle detecting step that calculates an angle from the frequency calculation data generated by the frequency calculating step.

In the image processing device and the processing method thereof, the binary image generating part generates binary image data from the input image data inputted by the input part, the skew angle detecting part detects a skew angle of the input image data from the binary image data. In this case, in the skew angle detecting part, the Hough transform part executes the Hough transform to the binary image data generated by the binary image generating part to generate Hough space data. Next, the frequency calculating part executes a specific calculation to each of frequencies of data from the Hough space data generated by the Hough transform part, and adds the attained calculation result by each angle to generate frequency calculation data. And, the angle detecting part calculates an angle from the frequency calculation data generated by the frequency calculating part.

BRIEF DESCRIPTION OF THE DRAWINGS

Preferred embodiments of the present invention will be described in detail based on the followings, wherein:

FIG. 5 is a chart illustrating another example of the pixel configuration used in the expansion unit and the contraction unit;

DETAILED DESCRIPTION OF PREFERRED EMBODIMENTS

The preferred embodiments of the invention will be described in detail with reference to the accompanying drawings.

<First Embodiment>

Figure 1:
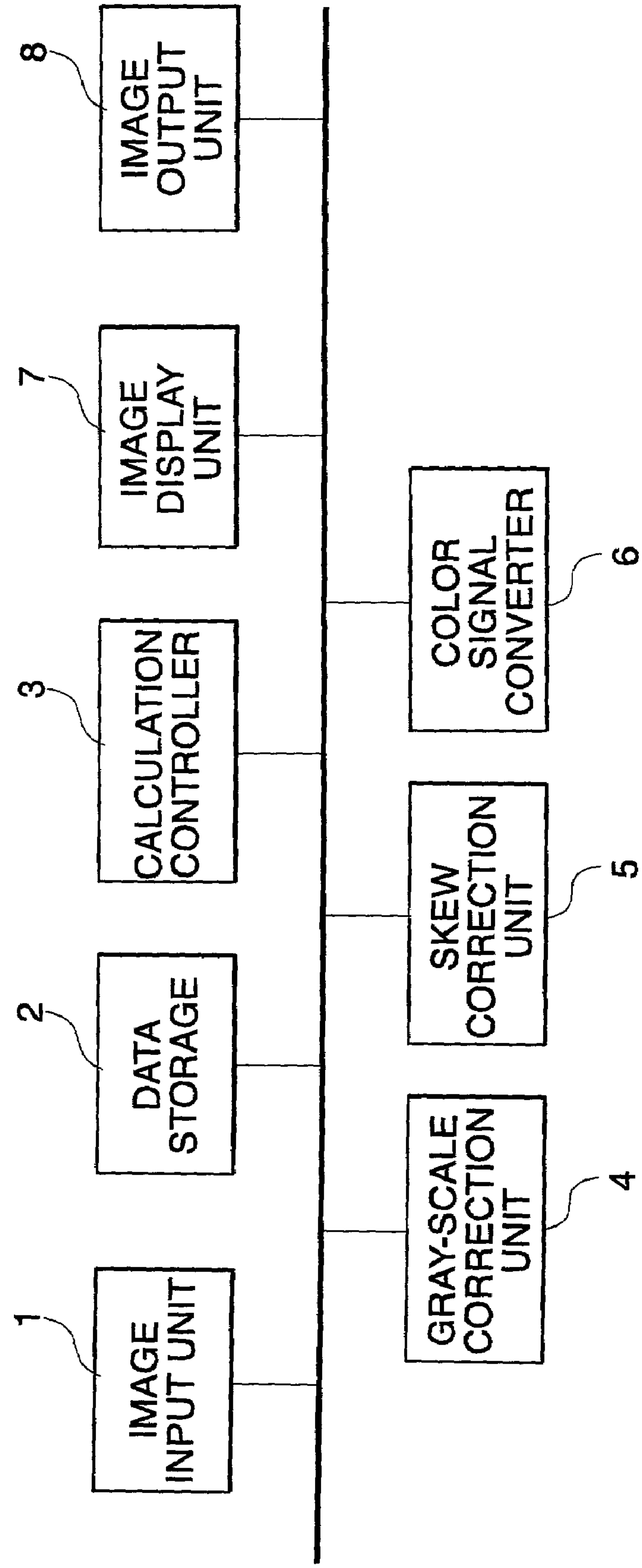
FIG. 1 is a block diagram illustrating a configuration of an image processing device relating to the invention.

FIG. 1 is a block diagram illustrating a configuration of an image processing device relating to the first embodiment of the invention. In the drawing, an image input unit 1 reads color image information of a copy by each color, and converts the information into an electric digital image signal to output the result, which is made up with, for example, an image scanner using a solid state image pickup device, such as a CCD (Charge Couple Device), as a photoelectric transducer. Here, the digital image signal read and converted to an electric signal by the image input unit 1 is assumed as the RGB color image signal of 8 bits for each color, with the resolution 400 dpi; and the following description will be made on this assumption.

A data storage 2 stores image data inputted by the image input unit 1, and image data to which the other processing units have executed the image processing, and the like. A calculation controller 3 is made up with a microprocessor and a memory, etc., and the microprocessor executes an image processing program contained in the memory to thereby control the other processing units. Here, the image processing program executed by the microprocessor may be one that is contained in the memory in advance, or one that is installed from a recording medium such as a CD-ROM.

The RGB image data (8 bits for each of RGB colors) outputted from the image input unit 1 are stored in the data storage 2. The RGB image data outputted from the image input unit 1, stored in the data storage 2 are read out in accordance with the instruction of the calculation controller 3 by a gray-scale correction unit 4, in which the gray-scale of the image is corrected. The RGB image data with the gray-scale thereof corrected by the gray-scale correction unit 4 are stored in the data storage 2.

The RGB image data outputted from the gray-scale correction unit 4, stored in the data storage 2, are read out in accordance with the instruction of the calculation controller 3 by a skew correction unit 5, in which the skew of the image data is corrected. The RGB image data with the skew thereof corrected by the skew correction unit 5 are stored in the data storage 2. The detail of the skew correction unit 5 will be explained later. The RGB image data outputted from the skew correction unit 5, stored in the data storage 2, is read out in accordance with the instruction of the calculation controller 3 by an image display unit 7 made up with, for example, a CRT or LCD, etc., in which the image is displayed.

The RGB image data outputted from the skew correction unit 5, stored in the data storage 2, is read out in accordance with the instruction of the calculation controller 3 by a color signal converter 6, in which the RGB image signal is converted into an output color signal (for example, YMCK image signal). The YMCK image data with the color signal conversion executed by the color signal converter 6 is stored in the data storage 2. The YMCK image data outputted from the color signal converter 6, stored in the data storage 2, is read out in accordance with the instruction of the calculation controller 3 by an image output unit 8, in which the image data is printed out on paper, for example.

Figure 2:
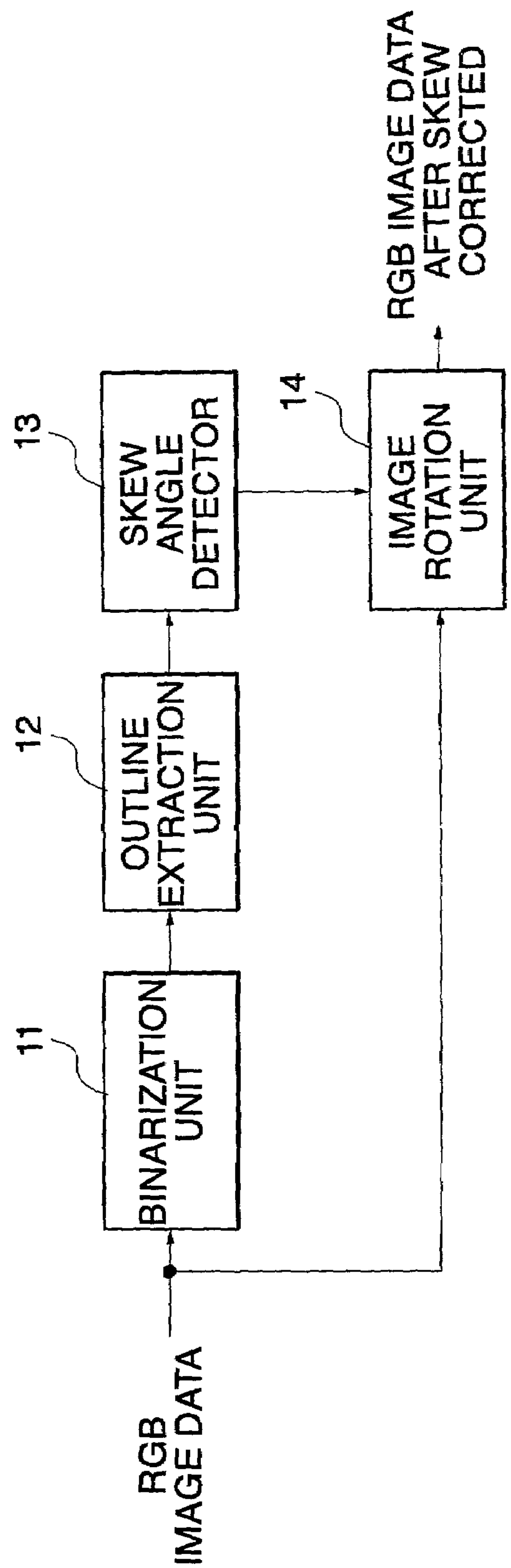
FIG. 2 is a block diagram illustrating a configuration of a skew correction unit relating to the first embodiment of the invention.

Next, the skew correction unit 5 will be detailed with reference to FIG. 2. In FIG. 2, the image data (RGB image signal of 8 bits for each color, resolution 400 dpi) inputted to the skew correction unit 5 are inputted to a binarization unit 11 and an image rotation unit 14. The binarization unit 11 converts the inputted RGB image data into binary image data by binarizing the pixels belonging to the foreground region contained in the image such as characters, lines, patterns, photographs as HIGH, and the pixels belonging to the background region as LOW, and outputs the binary image data. The binarization unit 11 also has a function as a pixel block extracting part that extracts a pixel block of HIGH pixels (ON pixels) out of the binary image data. The binarization unit 11 will be detailed later.

The binary image data outputted from the binarization unit 11 are inputted to an outline extraction unit 12. The outline extraction unit (namely, the representative point extraction unit) 12 extracts and outputs the outline (representative points of a pixel block) of a HIGH pixel region out of the inputted binary image data, and creates outline binary image data by the extracted outline pixels. The outline extraction unit 12 will be detailed later. The outline binary image data outputted from the outline extraction unit 12 is inputted to a skew angle detector 13. The skew angle detector 13, using the inputted outline binary image data, calculates a skew angle of the image data. The skew angle detector 13 will be detailed later.

The skew angle detected by the skew angle detector 13 is inputted to the image rotation unit 14. The image rotation unit 14 is supplied with the RGB image data as well, in which the skew of the RGB image data is corrected on the basis of the skew angle detected by the skew angle detector 13. As an image rotation method, for example, a well-known method using the Affine transform or the like can be employed. The RGB image data after the skew is corrected are outputted as a skew correction result by the skew correction unit 5.

Figure 3:
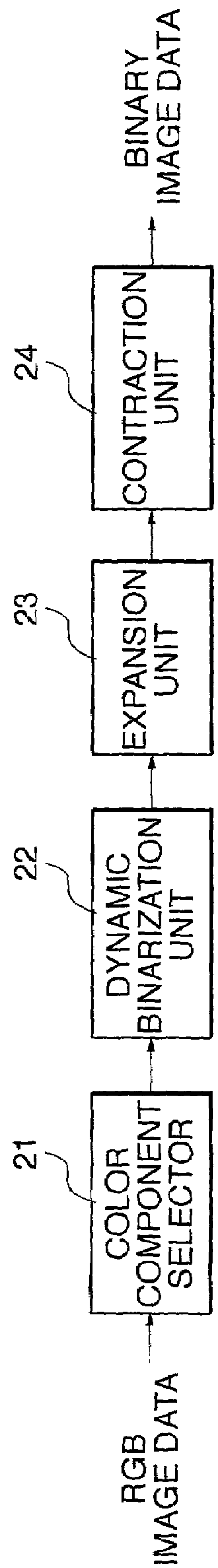
FIG. 3 is a block diagram illustrating a configuration of a binarization unit.

Next, the binarization unit 11 will be described in detail with reference to FIG. 3. The RGB image data inputted to the binarization unit 11 is inputted to a color component selector 21. The color component selector 21 takes out only the G signal components from the inputted RGB image data, and creates and outputs the G image data (resolution 400 dpi, 8 bits for each pixel). The reason of taking out only the G signal lies in that the G signal contributes most significantly to the image information among the R, Q and B signals.

The G image data outputted from the color component selector 21 are inputted to a dynamic binarization unit 22. The dynamic binarization unit 22, using the pixels surrounding a target pixel, executes dynamic binarization processing, namely, dynamic threshold binarization processing, and sequentially scans the pixels to binarize the whole image. The dynamic binarization unit 22 will be detailed later. The dynamic binarization unit 22 outputs the binary image data in which the pixels belonging to the deep color region are binarized as HIGH, and the pixels belonging to the light color region are binarized as LOW.

The binary image data outputted from the dynamic binarization unit 22 is inputted to an expansion unit 23. The expansion unit 23, sequentially scanning the pixels, executes expansion processing to the HIGH pixels. Here in this case, the binary image data is directly inputted to the expansion unit 23, however it is possible to adopt a configuration that a reduction unit (not illustrated) executes reduction processing to the binary image data, and thereafter inputs the binary image data (the first pixel block) extracted by this compression processing to the expansion unit 23. Thereby, the noise components can be removed.

Figure 4A:
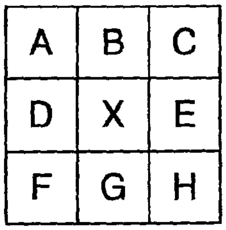
FIG. 4A to FIG. 4D are charts explaining the processing contents of an expansion unit and a contraction unit.

The expansion processing executed in the expansion unit 23 will be explained with reference to FIG. 4. As shown in FIG. 4A, assuming that "X" represents a target pixel, and "A" to "H" represent the eight pixels surrounding the target pixel "X", and if there is even one HIGH pixel among the pixel "X" and the pixels "A" to "H", namely, 3×3 pixels including the central target pixel "X", the expansion unit 23 will output HIGH as the expansion processing result to the target pixel "X"; and if all the pixels of the pixel "X" and the pixels "A" to "H", namely, 3×3 pixels including the central target pixel "X" are LOW pixels, the expansion unit 23 will output LOW as the expansion processing result to the target pixel "X".

Figure 4B:
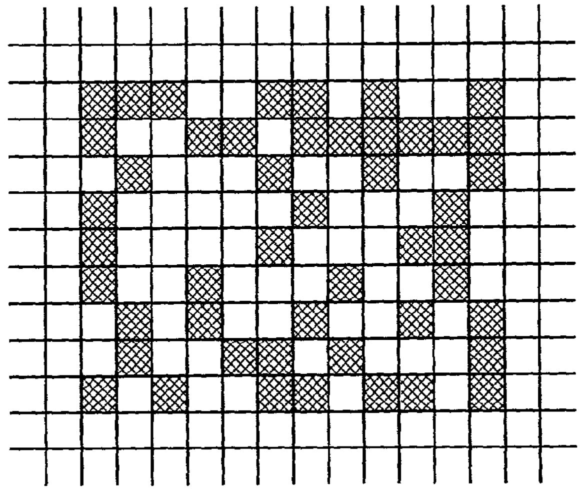
Figure 4C:
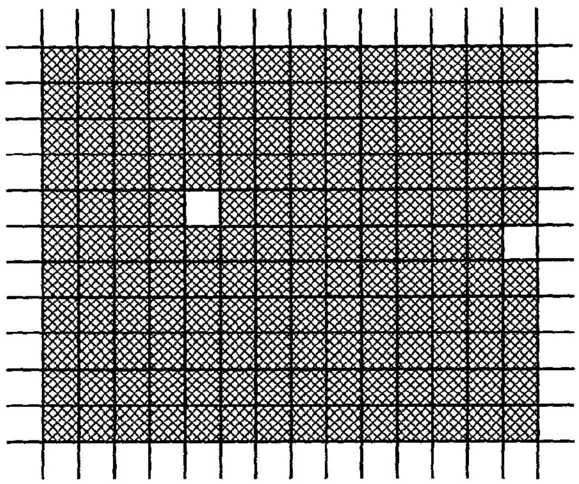

The expansion unit 23, sequentially scanning the pixels, executes this processing to the whole image. If it receives the binary image data as shown in FIG. 4B, for example, the expansion unit 23 outputs the binary image data as shown in FIG. 4C as the expansion result. Here in the above case, for the expansion processing were used the target pixel and the eight pixels surrounding the target pixel, namely, 3×3 pixels including the central target pixel. However, as shown in FIG. 5, the pixel "X" and the pixels "A" to "Y", namely, 5×5 pixels including the central target pixel "X" may be used, a still larger region may be used, or even a region having different pixel numbers in the fast-scanning and slow-scanning directions may be used for the expansion processing.

As mentioned above, the expansion unit 23 executes the expansion processing of the HIGH pixels to the binary image data created by the dynamic binarization unit 22; thereby, even if the dynamic binarization unit 22 binarizes the photograph and halftone dot regionregions contained in the input image as LOW, the expansion processing of the HIGH pixels by the expansion unit 23 will turn the pixels having been determined as LOW in the region into HIGH, and it will continuously connect the whole region with the HIGH pixels (second pixel block).

The binary image data outputted from the expansion unit 23 is inputted to a contraction unit 24. The contraction unit 24, sequentially scanning the pixels, executes contraction processing of HIGH pixels. The contraction processing will be explained with reference to FIG. 4.

As shown in FIG. 4A, assuming that "X" represents a target pixel, and "A" to "H" represent the eight pixels surrounding the target pixel "X", and if there is even one LOW pixel among the pixel "X" and the pixels "A" to "H", namely, 3×3 pixels including the central target pixel "X", the contraction unit 24 will output LOW as the contraction processing result to the target pixel "X"; and if all the pixels of the pixel "X" and the pixels "A" to "H", namely, 3×3 pixels including the central target pixel "X" are HIGH pixels, the contraction unit 24 will output HIGH as the contraction processing result to the target pixel "X".

Figure 4D:
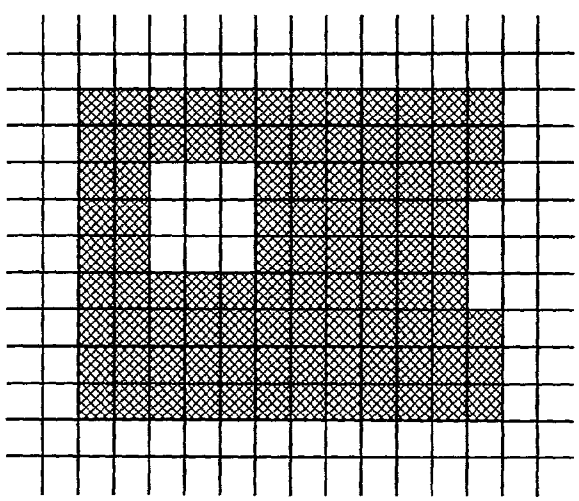

The contraction unit 24, sequentially scanning the pixels, executes this processing to the whole image. If it receives the binary image data as shown in FIG. 4C, for example, the contraction unit 24 outputs the binary image data as shown in FIG. 4D as the contraction result. Here in the above case, for the contraction processing were used the target pixel and the eight pixels surrounding the target pixel, namely, 3×3 pixels including the central target pixel. However, in the same manner as the case with the expansion processing, as shown in FIG. 5, the pixel "X" and the pixels "A" to "Y, namely, 5×5 pixels including the central target pixel "X" may be used, a still larger region may be used, or even a region having different pixel numbers in the fast-scanning and slow-scanning directions may be used for the contraction processing.

Thus, the contraction unit 24 executes the contraction processing to the binary image data outputted from the expansion unit 23, which makes it possible to disconnect the pixel regions having been connected (coupled) by the expansion processing. The binary image data (third pixel block) created by the contraction unit 24 is outputted as the processing result executed by the binarization unit 11.

In this embodiment, the binary image data (third pixel block) having passed through the contraction unit 24 is supplied as the processing result by the binarization unit 11 to the outline extraction unit 12 to extract outline pixels. However, it may be configured that the extraction of the outline pixels is carried out on the basis of the binary image data (first pixel block) having passed through the aforementioned reduction unit (not illustrated), or the binary image data (second pixel block) having passed through the expansion unit 23.

Figure 6:
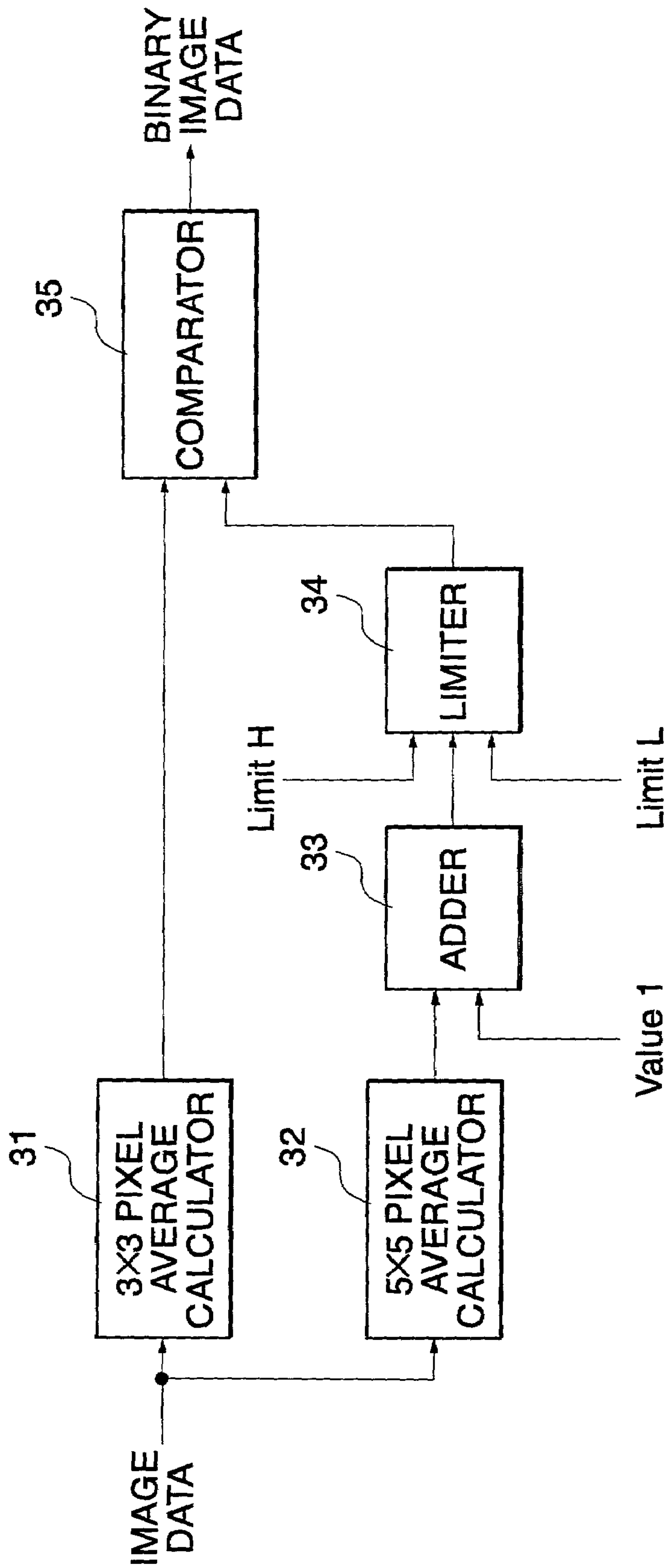
FIG. 6 is a block diagram illustrating a configuration of a dynamic binarization unit.

Next, the dynamic binarization unit 22 will be detailed with reference to FIG. 6. The image data inputted to the dynamic binarization unit 22, which is the G image data of 8 bits for each pixel and the resolution 400 dpi in this embodiment, is inputted to a 3×3 pixel average calculator 31 and a 5×5 pixel average calculator 32. The 3×3 pixel average calculator 31, sequentially scanning the target pixel, calculates a pixel average of the 3×3 pixels including the central target pixel. The average image data of the 3×3 pixels, calculated by the 3×3 pixel average calculator 31, is inputted to a comparator 35 described later.

The 5×5 pixel average calculator 32, sequentially scanning the target pixel, calculates a pixel average of the 5×5 pixels including the central target pixel. The average image data of the 5×5 pixels, calculated by the 5×5 pixel average calculator 32, is inputted to an adder 33. The adder 33 adds the image data inputted from the 5× 5 pixel average calculator 32 and a "Value1", which is preset, and the calculation result is inputted to a limiter 34.

In the above case, the "Value1" is stipulated as a preset value; however, it may be a value calculated by a specific calculation using the output of the 3×3 pixel average calculator 31, or the 5×5 pixel average calculator 32, or it may be a value calculated through a LUT (Look Up Table).

The limiter 34 limits the pixel value of the image data inputted from the adder 33 between a preset upper limit "LimitH" and a preset lower limit "LimitL". That is, Target pixel value>LimitH→output value to target pixel=LimitH, Target pixel value<LimitL→output value to target pixel=LimitL, and Other than the above→output value to target pixel=input value of target pixel.

The output of the limiter 34 is supplied to the comparator 35. The comparator 35 is supplied with the image data outputted from the 3×3 pixel average calculator 31 and the image data outputted from the limiter 34. And, the comparator 35 compares the corresponding pixels of the two image data pieces.

Now, provided that the pixel value of a pixel belonging to the bright (light) region is large, and the pixel value of a pixel belonging to the dark (deep) region is small; and if the pixel value of the target pixel of the image data inputted from the 3×3 pixel average calculator 31 is equal or smaller than the pixel value of the corresponding target pixel of the image data inputted from the limiter 34, the comparator 35 will output HIGH as the comparison result to the target pixel. If the former is larger than the latter on the contrary, the comparator 35 will output LOW as the comparison result to the target pixel.

The foregoing binarization processing allows the extraction of the pixels belonging to the deep region as the HIGH pixels. That is, the deep characters, and the deep photograph and pattern regions, etc., drawn on a white copy can be extracted as the HIGH pixels. The comparison result outputted from the comparator 35, namely, the binary image data, is outputted as the calculation result of the dynamic binarization unit 22.

Figure 7:
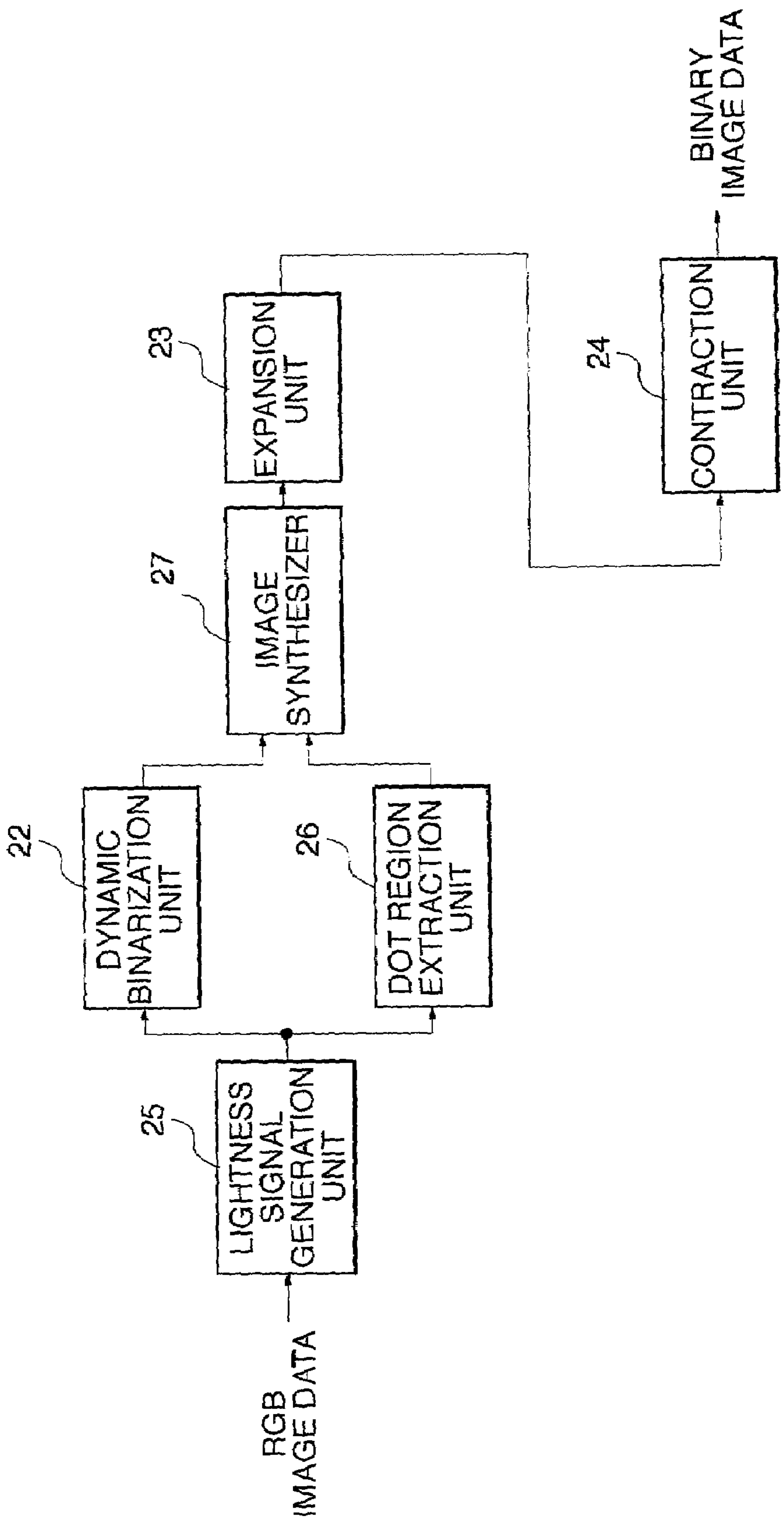
FIG. 7 is a block diagram illustrating another configuration of the binarization unit.

Next, another example of the binarization unit 11 will be explained with reference to FIG. 7. The RGB image data inputted to the binarization unit 11 is inputted to a lightness signal generator 25. The lightness signal generator 25 generates lightness image data (L* image data) (resolution 400 dpi, 8 bits for each pixel) from the inputted RGB image data. The lightness image data may be acquired by the calculation using the XYZ color space, or using the LUT, or by the other methods; however, it may be acquired by using a simplified calculation equation as the expression (1), to simplify the calculation processing.

$$L^*=(3R+6G+B)/10 \quad (1)$$

The L* image data generated by the lightness signal generation unit 25 is inputted to the dynamic binarization unit 22 and a halftone dot region extraction unit 26. The dynamic binarization unit 22 generates the binary image data, using the L* image data inputted from the lightness signal generation unit 25, in which the pixels belonging to the deep region are stipulated as HIGH and the pixels belonging to the light region are stipulated as LOW. The dynamic binarization unit 22 has already been detailed, and explanation here will be omitted.

The binary image data outputted from the dynamic binarization unit 22 is inputted to an image synthesizer 27. The halftone dot region extraction unit 26 extracts a dot region out of the L* image data inputted from the lightness signal generation unit 25, and carries out binarization that defines the pixels belonging to the dot region as HIGH and the pixels not belonging to the dot region as LOW. Several methods of extracting the dot region have been proposed; however for example, the extraction method disclosed in Japanese Published Unexamined Patent Application No. Hei 11-73503 put forward by the present applicant can also be used. Details of the extraction method will not be described here, however the outline will be as follows.

That is, the method binarizes the input image data, judges whether or not the HIGH pixels (or the LOW pixels) of the binary image data form a cyclic structure in such a wide pixel region as N1×N1 pixels including the central target pixel (for example, N1=13); and thereafter, with regard to the judgment result, using a wide region of N2×N2 pixels (for example, N2=25), the method judges and extracts a dot region. The binary image data outputted from the halftone dot region extraction unit 26 is inputted to the image synthesizer 27.

The image synthesizer 27 executes the logical sum (OR) operation of the pixels corresponding to the binary image data inputted from the dynamic binarization unit 22 and the halftone dot region extraction unit 26, and outputs the operation result. That is, the image synthesizer 27 creates the binary image data, in which if either of the pixels corresponding to the binary image data inputted from the dynamic binarization unit 22 and the halftone dot region extraction unit 26 is HIGH, the output to these pixels is HIGH, and if the both pixels are LOW, the output to these pixels is LOW.

The binary image data outputted from the image synthesizer 27 is inputted to the expansion unit 23. The expansion unit 23 executes the expansion processing of the HIGH pixels of the binary image data inputted from the image synthesizer 27, and outputs the result to the contraction unit 24. The contraction unit 24 executes the contraction processing of the HIGH pixels of the binary image data inputted from the expansion unit 23, and outputs the result. The expansion unit 23 and the contraction unit 24 have already been detailed, and explanation here will be omitted. The output of the contraction unit 24 is delivered as the processing result of the binarization unit 11.

Next, the outline extraction processing by the outline extraction unit 12 will be described in detail with reference to FIG. 8A to FIG. 8D and FIG. 9A and FIG. 9B. The outline extraction unit 12 extracts the outline of the HIGH pixel region, using the binary image data inputted from the binarization unit 11, and creates outline binary image data in which only the extracted outline is defined as the HIGH pixels.

Figure 8A:
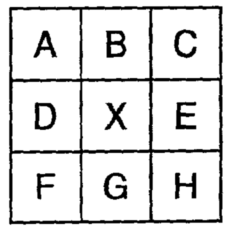
FIG. 8A to FIG. 8D are charts (No. 1) explaining the processing contents of an outline extraction unit.
Figure 8B:
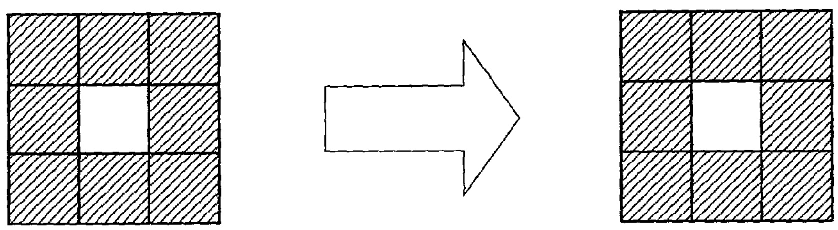
Figure 8C:
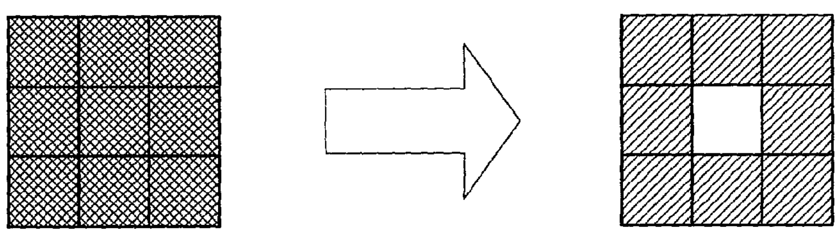
Figure 8D:
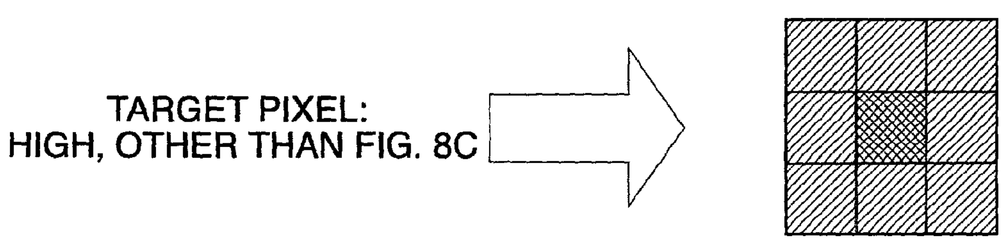

As shown in FIG. 8A, assuming that a target pixel is "X", and the eight adjoining pixels surrounding "X" are "A" to "H", when the pixel "X" is LOW, as shown in FIG. 8B, the outline extraction unit 12 judges that the target pixel is not the outline pixel, and outputs LOW as the output to the target pixel. When the pixel "X" and the pixels "A" to "H" are all HIGH, as shown in FIG. 8C, the outline extraction unit 12 also judges that the target pixel is not the outline pixel, and outputs LOW as the output to the target pixel. And, when the target pixel "X" is HIGH and the other pixels surrounding "X" are different from those in FIG. 8C, as shown in FIG. 8D, the outline extraction unit 12 judges that the target pixel is the outline pixel, and outputs HIGH as the output to the target pixel.

Figure 9A:
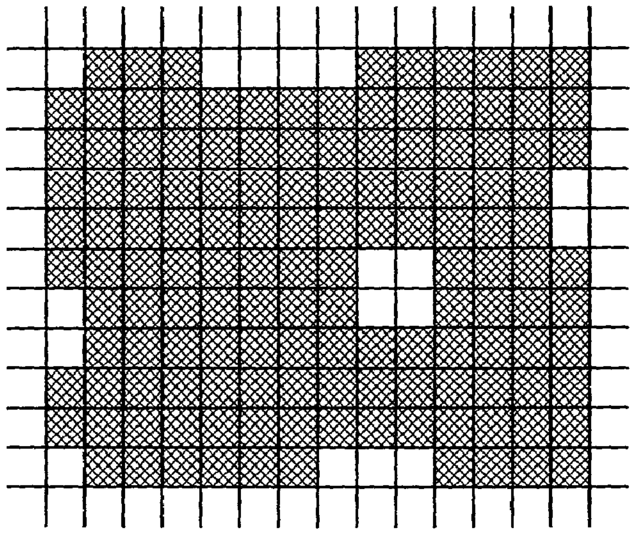
FIG. 9A and FIG. 9B are charts (No. 2) explaining the processing contents of the outline extraction unit.
Figure 9B:
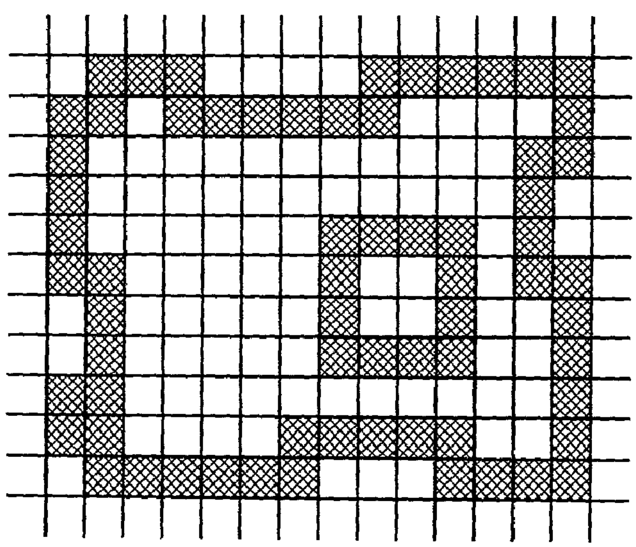

When the binary image as shown in FIG. 9A is inputted to the outline extraction unit 12, for example, the outline extraction unit 12 outputs the outline binary image data having the outline extracted, as shown in FIG. 9B. Here in this embodiment, when the target pixel is HIGH and the condition except the target pixel is different from that in FIG. 8C, the target pixel is judged as the outline pixel; however, it may be configured that, except when all of the 3×3 pixels including the central target pixel are HIGH or LOW, the target pixel is judged as the outline pixel.

However, if the method is adopted which judges the target pixel as the outline pixel, except when all of the 3×3 pixels including the central target pixel is HIGH or LOW, it will increase the pixels to be judged as the outline pixel, resulting in making the outline thick, which will increase the number of pixels to be the processing objects thereafter, and require more processing time. In contrast to this, if a method is adopted which judges the target pixel as the outline pixel, when the target pixel is HIGH and the condition except the target pixel is different from that in FIG. 8C, the number of pixels to be judged as the outline pixel will be decreased to less than half, which effects an advantage of reducing the processing time to less than half.

Figure 10:
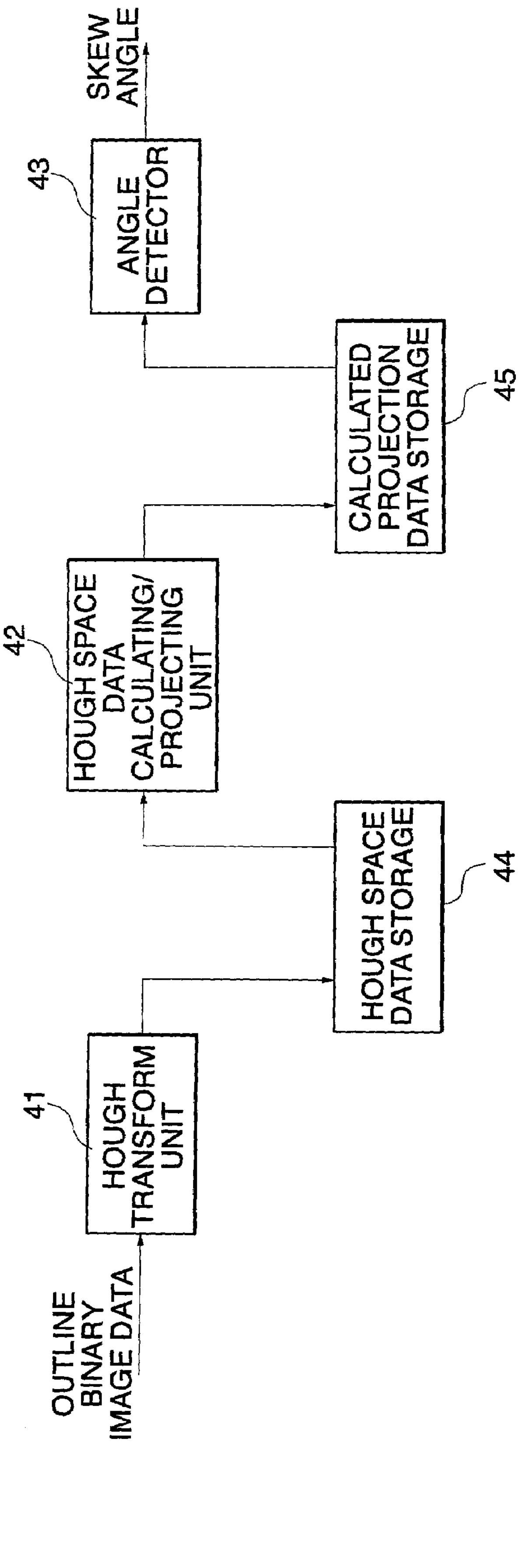
FIG. 10 is a block diagram illustrating a configuration of a skew angle detector.

Next, the skew angle detector 13 will be detailed with reference to FIG. 10. The outline binary image data inputted to the skew angle detector 13 is inputted to a Hough transform unit 41. The Hough transform unit 41 executes the Hough transform to the HIGH pixels of the outline binary image data inputted thereto, and inputs the calculation (transform) result (Hough space data) to a Hough space data storage 44. The Hough transform unit 41 will be detailed later.

The Hough space data storage 44 sequentially stores the Hough space data inputted from the Hough transform unit 41. The Hough space data storage 44 will be detailed later. A Hough space data calculating/projecting unit (frequency calculating part) 42 sequentially reads out the data stored in the Hough space data storage 44, executes a specific calculation, and thereafter inputs the calculation result (first calculated frequency data) sequentially to a calculated projection data storage 45. The Hough space data calculating/projecting unit 42 will be detailed later.

The calculated projection data storage 45 sequentially stores the calculated frequency data inputted from the Hough space data calculating/projecting unit 42. The calculated projection data storage 45 will be detailed later. An angle detector 43 sequentially reads out the calculated frequency data stored in the calculated projection data storage 45, calculates the maximum value of the data read out, detects the angle that gives the maximum value, and outputs the angle detected. The angle detector 43 will be detailed later. The angle outputted from the angle detector 43 is outputted as a skew angle that the skew angle detector 13 has detected.

The details of the processing units inside the skew angle detector 13 will be described. First, the processing in the Hough transform unit 41 and the Hough space data storage 44 will be detailed with reference to FIG. 11A to FIG. 11D and FIG. 12A to FIG. 12C.

Figure 11A:
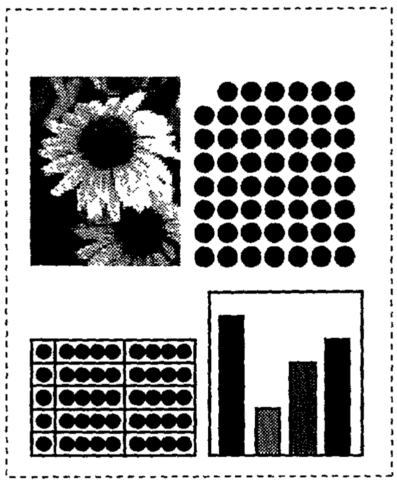
FIG. 11A to FIG. 11D are charts explaining the processing contents of a Hough transform unit and a Hough space data storage.
Figure 11B:
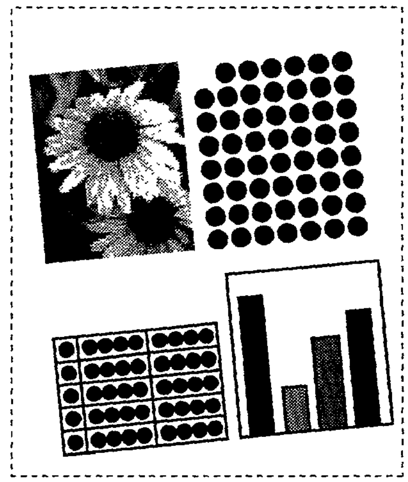
Figure 11C:
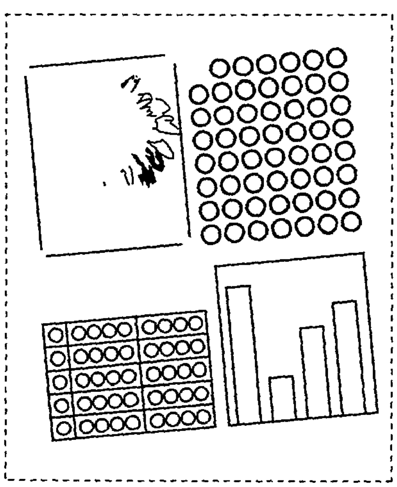
Figure 11D:
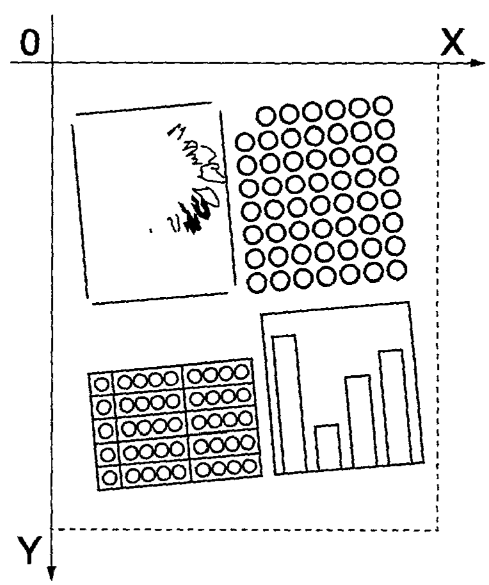

An image shown in FIG. 11A is a copy image read out by the image input unit 1. And, when reading out the copy image shown in FIG. 11A, the image input unit 1 is presumed to attain an image with a skew, as shown in FIG. 11B. Here, in FIG. 11B, FIG. 11C, and FIG. 11D, the rectangular dotted lines surrounding the images show the borders of the images, which do not appear in the images. The binarization unit 11 carries out the binarization processing to the image shown in FIG. 11B, and the outline extraction unit 12 further executes the outline extraction processing to thereby attain the image, as shown in FIG. 11C. This image shown in FIG. 11C is inputted to the Hough transform unit 41.

Figure 12A:
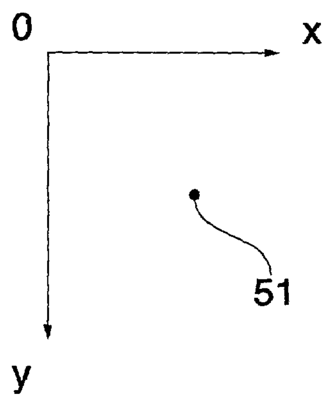
FIG. 12A to FIG. 12C are charts explaining the concept of the Hough transform.
Figure 12B:
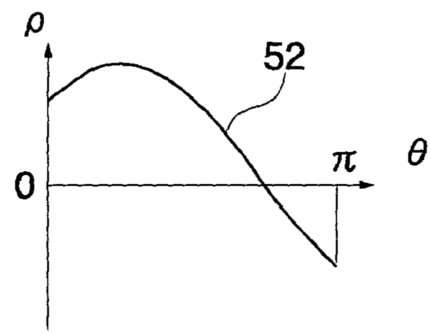

Since the Hough transform is a well-known technique, the detailed explanation will be omitted. However, to put it in brief, the Hough transform can be defined as processing that transforms a point existing on the x-y coordinate space into a polar coordinate (ρ-θ) space expressed by the distance from the origin and the angle. For example, carrying out the Hough transform to one point 51 shown in FIG. 12A will result in a curve 52 shown in FIG. 12B. In FIG. 12B, θ represents the angle, and ρ represents the distance, and the curve 52 can be given by the expression (2). The x, y in the expression (2) signifies the coordinate of a point on the (x-y) coordinate space.

$$\rho = x\cdot\cos\theta + y\cdot\sin\theta \qquad (2)$$

Figure 12C:
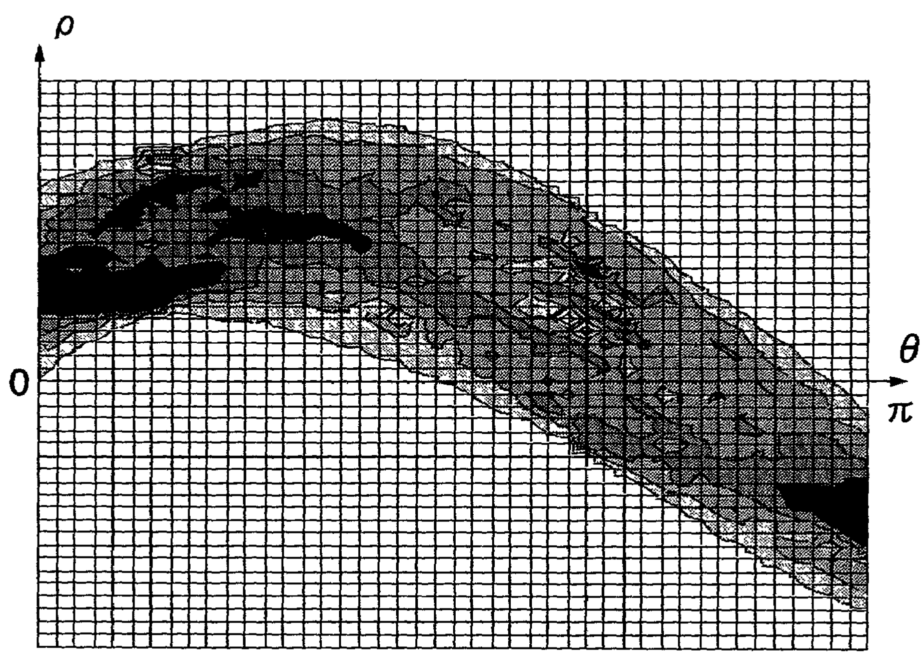

When executing the Hough transform to the image illustrated in FIG. 11 C, the Hough transform unit 41 creates the histogram on the polar coordinate (ρ-θ) space, as shown in FIG. 12C, which is stored in the Hough space data storage 44. Here, the histogram data created actually is given by numeric values; the white (light color) region in FIG. 12C shows that the frequency is zero or very low, and as the color becomes deeper, the frequency becomes higher.

Figure 13:
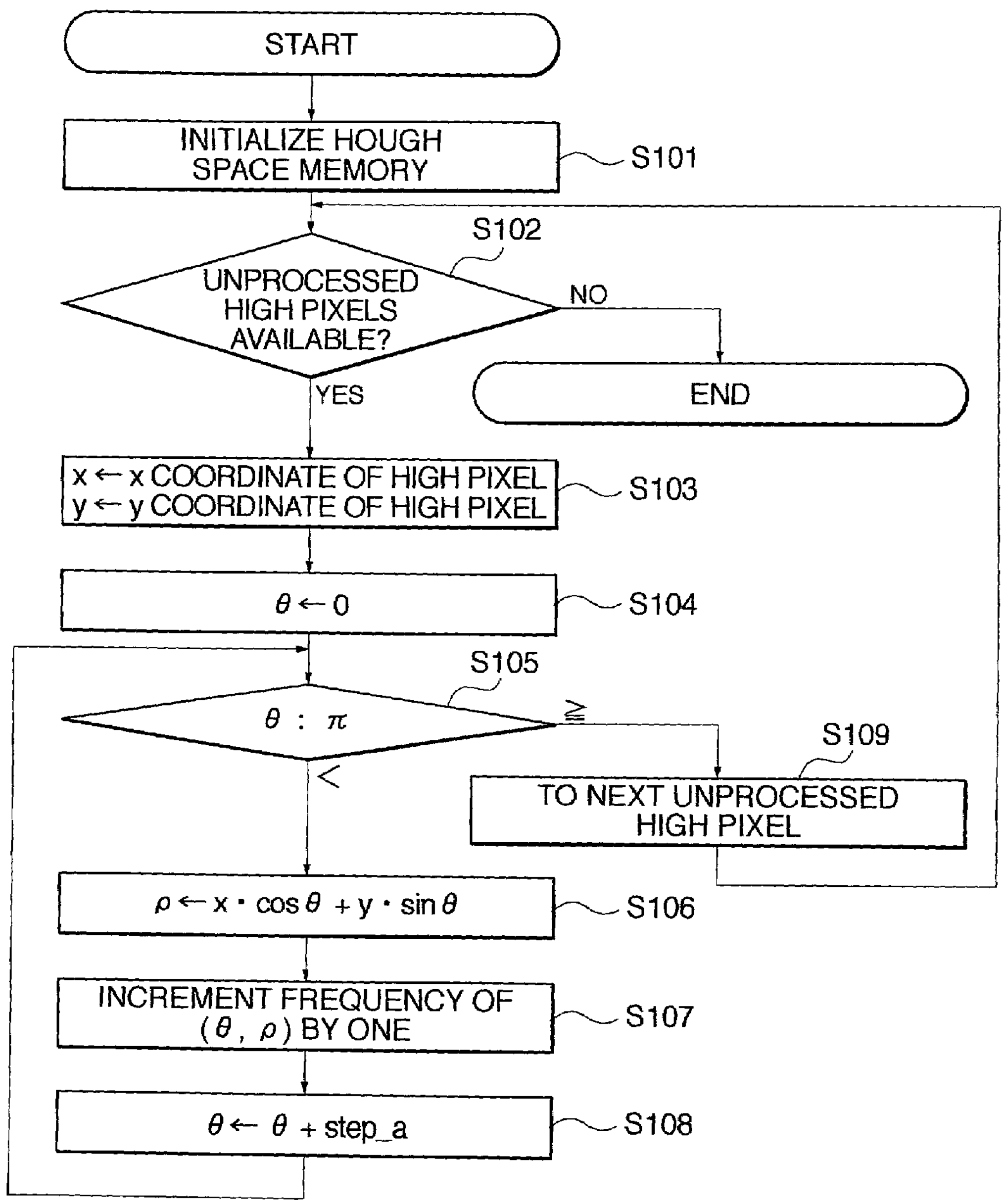
FIG. 13 is a flowchart illustrating the processing flow of the Hough transform unit.

The processing procedure of creating the histogram on the polar coordinate (ρ-θ) space as shown in FIG. 12C will be described with reference to a flowchart in FIG. 13. In the flowchart in FIG. 13, first, step S101 initializes the Hough space memory beforehand secured in the Hough space data storage 44, namely, substitutes "0" for all the frequencies.

Next, in order to execute the Hough transform to all the pixels with the outline extracted, step S102 judges whether or not there are the HIGH pixels with the Hough transform not having carried out, and if not, the step will terminate the processing by the Hough transform unit 41. If the unprocessed HIGH pixels are available, step S103 substitutes the x, y coordinates of the unprocessed HIGH pixels being the objects for the Hough transform for the valuables x, y; next, to execute the calculation of the expression (2) while sequentially varying the angle θ, step S104 substitutes 0 (rad) as the initial value for the angle θ.

Next, step S105 compares the angle θ with π (rad), if $\theta \geqq \pi$ is met, the step will terminate the Hough transform to the HIGH pixels now being the objects; and if $\theta < \pi$ is met, the step will continue the Hough transform. Here, the reason in comparing the angle θ with π (rad) is as follows. The Hough transform in itself is processing for detecting a line, which is able to express the direction of the line within the range of $0 \leqq \theta < \pi$. Since the range of $\pi \leqq \theta < 2\pi$ is equivalent to a semi-rotation of the line, the calculation processing can be omitted. In this embodiment, the calculation is set to range $0 \leqq \theta < \pi$, however it may be $-\pi/2 \leqq \theta < \pi/2$, or the like.

If the comparison result at step S105 is $\theta < \pi$, step S106 carries out the calculation on the right side of the expression (2), using x, y, and θ, and substitutes the calculation result for the distance ρ. Next, step S107, using the angle θ and the value of the distance ρ acquired at step S106, increases the frequency of the Hough space coordinate (θ, ρ) in the Hough space data storage 44 by one increment.

Normally, the value of the distance ρ acquired at step S106 is given by a decimal, which unavoidably involves conversion of the value of the distance ρ into an integer in order to practically carry out the processing at step S107 by means of round-off, round-up, round-down, etc. And, it is possible to further quantize the distance ρ in order to reduce the capacity of the Hough space memory.

Next, in order to calculate the right side of the expression (2) using the angle θ, step S108 increases the angle θ by a predetermined increment of step_a. This value is determined by the resolution of the skew angle to be acquired. Therefore, to acquire the skew angle by the resolution in a unit of 1 degree will require setting the step_a to 1 (degree)=π/180 (rad), and to acquire the skew angle by the resolution in a unit of 0.1 degree will require setting the step_a to 0.1 (degree)=π/1800 (rad). Terminating the processing at step S108, the step returns to step S105.

When completing the Hough transform processing to one HIGH pixel, namely, the calculation on the right side of the expression (2) within the range of $0 \leqq \theta < \pi$, at step S103 through step S108, step S109 transfers the object to a next unprocessed HIGH pixel.

As mentioned above, the Hough transform unit 41 carries out the Hough transform processing to the inputted outline binary image data, and creates the Hough space data (histogram) in the Hough space memory inside the Hough space data storage 44. Here, the Hough transform unit 41 is able to smooth the created Hough space data as well, using the frequency of the target pixel and the frequencies of the surrounding pixels. Thereby, if there is an abnormal state such that the frequency at one place only is high although the average frequency throughout a region is low, it will give a possibility to smooth such an abnormal state.

Figure 14A:
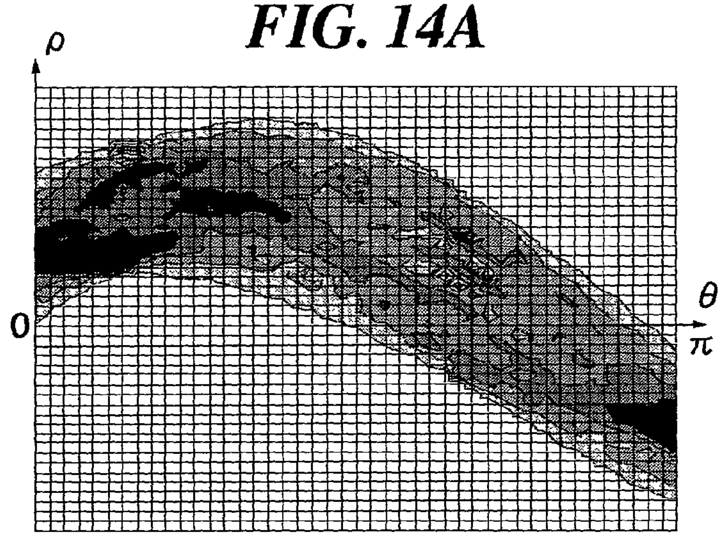
FIG. 14A to FIG. 14C are charts explaining the processing contents of a Hough space data calculating/projecting unit and a calculated projection data storage.
Figure 14B:
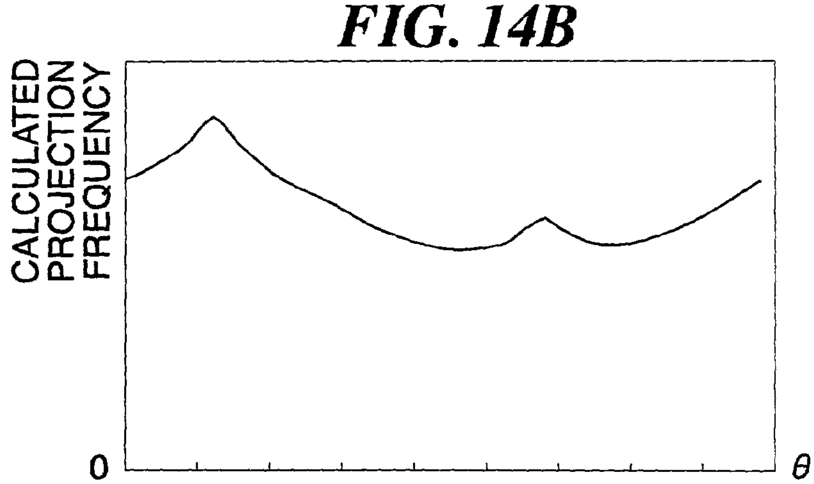

Next, the processing by the Hough space data calculating/projecting unit 42 and the calculated projection data storage 45 will be described in detail with reference to FIG. 14A to FIG. 14C. FIG. 14A illustrates the Hough space data (histogram) created in the Hough space memory inside the Hough space data storage 44, which is the same as in FIG. 12C.

The Hough space data calculating/projecting unit 42 sequentially reads out the frequencies from the Hough space data (histogram) illustrated in FIG. 14A, created in the Hough space memory inside the Hough space data storage 44, applies a specific calculation described later to the frequencies read out, and thereafter stores the acquired values in a calculated projection memory inside the calculated projection data storage 45. As the result, the calculated projection histogram data is created, as shown in FIG. 14B.

Figure 15:
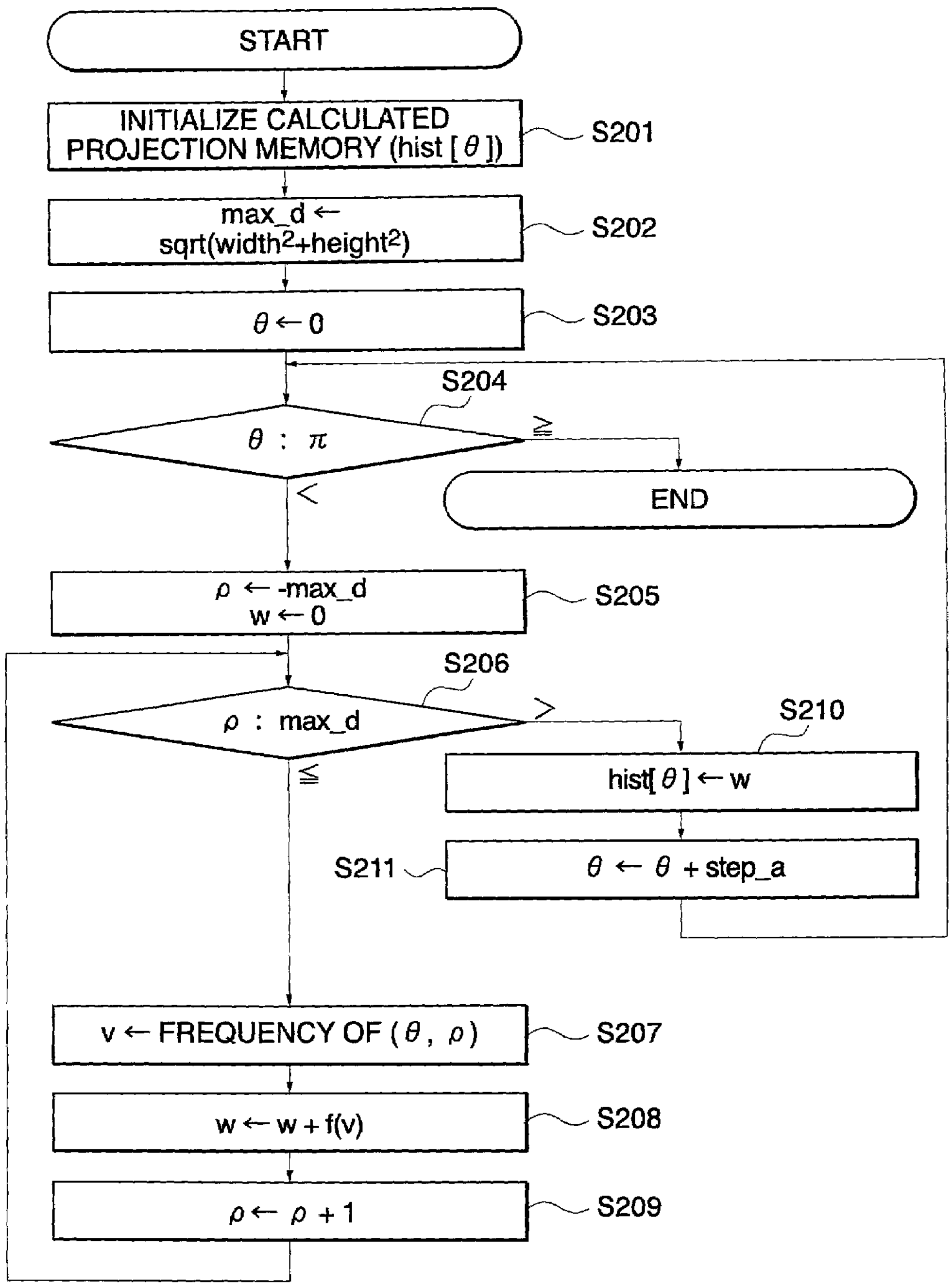
FIG. 15 is a flowchart illustrating the processing flow of the Hough space data calculating/projecting unit.

The processing procedure of creating the foregoing calculated projection histogram data will be explained with reference to a flowchart in FIG. 15. In the flowchart in FIG. 15, first, step S201 initializes the calculated projection memory inside the calculated projection data storage 45, namely, substitutes "0" for all the frequencies. Here, provided that the calculated projection memory is expressed by hist [θ], the step executes the processing of the hist [θ]←0 (θ: step_a×i, 0≦θ<π.

Next, step S202 calculates max_d=sqrt ($width^2+height^2$), in which width signifies the width of the outline binary image data, height signifies the height thereof. Here, sqrt ( ) represents the square root. Since the max_d signifies the length of a diagonal line of the outline binary image data, the maximum value of ρ of the Hough space data≦max_d, and the minimum of ρ≧−max_d are deduced.

And, to carry out the calculating/projecting processing while sequentially varying the angle θ, step S203 substitutes 0 (rad) for the angle θ as the initial value. Next, step S204 compares the angle θ with π, and if θ≧π is met, the step will terminate the calculating/projecting processing; and if θ<π is met, step S205 sets−max_d to ρ, and sets 0 to w as the initial value of the calculating/projecting processing.

Next, step 206 compares the distance ρ with max_d, and if ρ≦max_d is met, first, in order to continue the calculating/projecting processing to the current angle θ, step S207 reads out the frequency of the coordinate (θ, ρ) from the Hough space data (histogram), and substitutes the read out for the frequency v. Next, step S208 executes a specific calculation f(v) to the frequency v read out, and adds the calculation result to w. And, step S209 increases the distance ρ by one increment; thereafter the step returns to step S206.

Now, the calculation f(v) may adopt any one that enables calculating crowding of frequencies for each θ from the Hough space data (histogram). However, it is suitable to choose the calculation f(v) as shown by the expression (3), which simplifies the calculation processing and facilitates the detection of the crowding of the frequencies for each θ, namely, the skew angle from the Hough space data (histogram). That is, the calculation of the sum of n power of the frequencies for each θ, for example, the sum of square (n=2) permits a judgment that the crowding is higher as the calculation result is larger.

$$f(v)=v^2 \quad (3)$$

On the other hand, if ρ>max_d is met in the comparison at step S206, the step finishes all the calculating/projecting processing to the current angle θ, that is, the calculating/projecting processing to all the distances ρ possible to the current angle θ. Step S210 substitutes the acquired w for the hist [θ], as the calculated projection histogram data to the current angle θ. And, step S211 increases the angle θ by the predetermined increment of step_a for calculating/projecting processing of the next θ. This step_a is the same value as explained in FIG. 13. The step returns to the step S204, after terminating the processing at step S211.

As mentioned above, the Hough space data calculating/projecting unit 42 sequentially reads out the Hough space data (histogram) stored in the Hough space memory inside the Hough space data storage 44, executes specific calculation processing, and thereafter stores the result in the calculated projection data storage 45, and creates the calculated projection histogram data in the calculated projection memory inside the calculated projection data storage 45. Further, it is also possible that the Hough space data calculating/projecting unit 42 smoothes the frequency-calculated values of the created calculated frequency data, using the surrounding frequency-calculated values.

In the end, the processing by the angle detector 43 will be described with reference to FIG. 14A to FIG. 14C. FIG. 14B illustrates the calculated projection histogram data created in the calculated projection memory inside the calculated projection data storage 45. The angle detector 43 detects, from the calculated projection histogram data shown in FIG. 14B, the angle θ that maximizes calculated projection frequency, and outputs the angle θ detected.

Figure 14C:
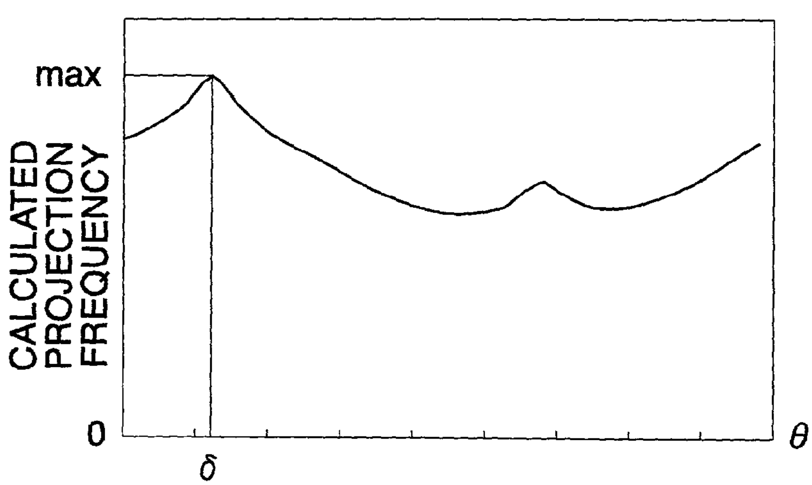

That is, as shown in FIG. 14C, the angle detector 43 finds out the maximum value max of the calculated projection frequency, and detects the angle δ at which the maximum value max of the calculated projection frequency is given, as the angle θ that maximizes the calculated projection frequency, and outputs this angle δ. The angle δ outputted from the angle detector 43 is outputted as the skew angle detected by the skew angle detector 13.

In the above description, the Hough transform (two-dimensional) is executed to the outline binary image data to create the Hough space data (histogram), and then a specific calculation is executed to the Hough space data (histogram) to create the calculated projection histogram data; however, the method of creating the data is not limited to the above.

That is, it is possible to execute the processing that executes the Hough transform at an angle to all of the HIGH pixels of the outline binary image data (one-dimensionally) to create the Hough space data (histogram), and next, executes a specific calculation to the created (one-dimensional) Hough space data (histogram) to create the calculated projection histogram data, while sequentially varying the angle. The use of this method converts two-dimensional Hough space data (histogram) into one-dimensional, which makes it possible to reduce the memory capacity required for the processing.

According to the image processing device and the processing method thereof, relating to the first embodiment of the invention, as described above, with regard to the image in which characters, line drawings, photographs, and dots, etc., are intermingled, without extracting the pixels contained in the photographic and halftone dot regions that behave as noises in detecting the skew angle, the method extracts the outline image appropriately to carry out the Hough transform, executes a specific calculation that allows detecting the crowding from the Hough space data to project the calculation result in the projection histogram, and detects the skew angle form this histogram projected, whereby it becomes possible to detect and correct the skew angle with high accuracy, regardless of the type of the input image.

<Second Embodiment>

Next, an image processing device relating to the second embodiment of the invention will be described. Here, in the following description, the processing units of the same processing contents as in the first embodiment are given the same numerical symbols, and the explanations thereof will be omitted. That is, in the image processing device relating to the second embodiment, since the configuration of the image processing device shown in FIG. 1 and the configuration of the skew correction unit 5 shown in FIG. 2 are the same as those in the first embodiment, explanation here will be omitted, and a skew angle detector will be described which has a different configuration from the first embodiment and bears a characteristic configuration.

Figure 16:
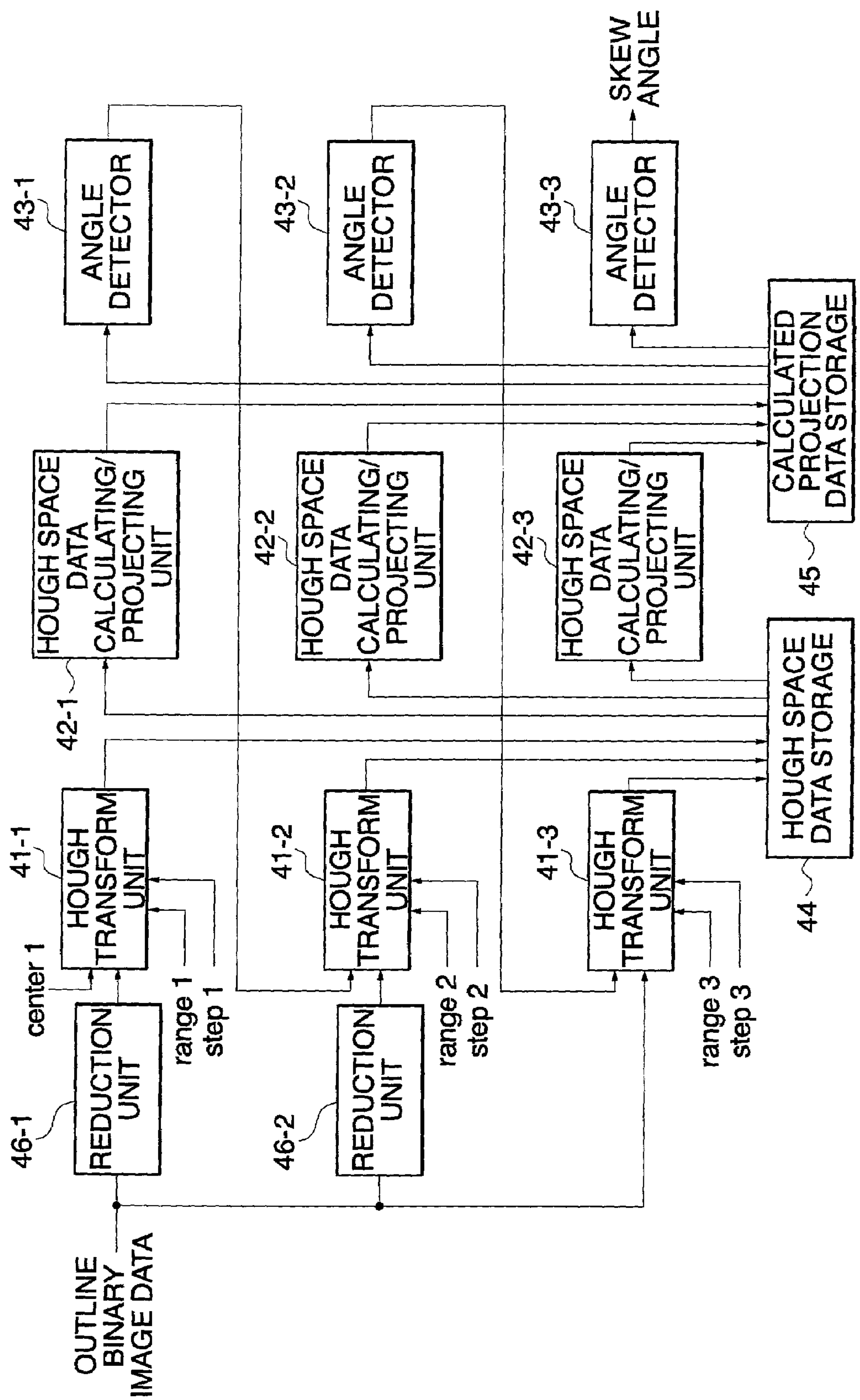
FIG. 16 is a block diagram illustrating a configuration of the skew angle detector relating to the second embodiment of the invention.

FIG. 16 is a block diagram illustrating a configuration of the skew angle detector in the image processing device relating to the second embodiment of the invention. In FIG.

16, the outline binary image data inputted from the outline extraction unit 12 is inputted to reduction units 46-1 to 46-2 and Hough transform units 41-3. The reduction unit 46-1 executes reduction of the inputted outline binary image data in order to reduce the calculation volume and the memory capacity required, when the approximate value of the first skew angle is calculated in the subsequent-stage Hough transform unit 41-1, Hough space data storage 44, Hough space data calculating/projecting unit 42-1, calculated projection data storage 45, and angle detector 43-1.

Figure 17A:
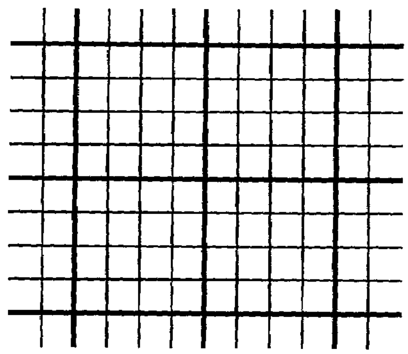
FIG. 17A to FIG. 17D are charts explaining the processing contents of one reduction unit in the skew angle detector relating to the second embodiment.
Figure 17B:
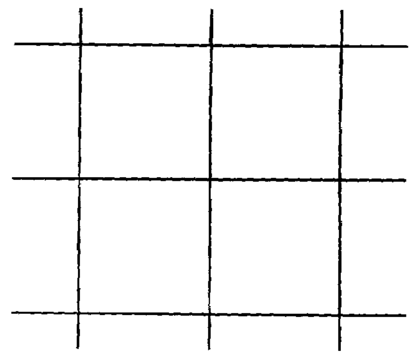
Figure 17C:
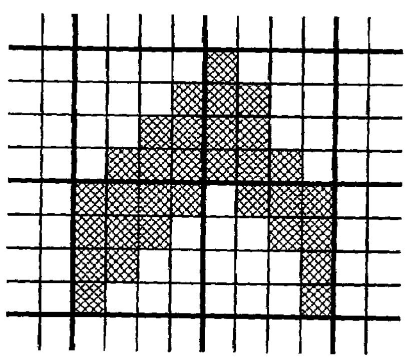
Figure 17D:
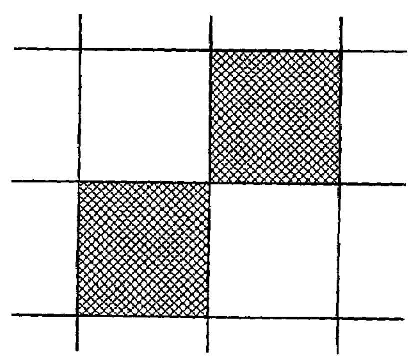

As a method of reducing the data, for example, as shown in FIG. 17A, the image is divided into plural 4×4 pixel matrixes, and each of the 4×4 pixel matrixes is assigned as one pixel after the reduction. In that case, if the number of the HIGH pixels exceeds a specific threshold in the 4×4 pixels=16 pixels, the pixel after the reduction is converted into HIGH; if the number of the HIGH pixels does not exceed the specific threshold, the pixel after the reduction is converted into LOW. As the threshold, for example, 16 pixels/2=8 pixels is suitable. In this case, if the image as shown in FIG. 17C is inputted, the image as shown in FIG. 17D is outputted from the reduction unit 46-1.

The outline binary image data outputted from the reduction unit 46-1 is inputted to the Hough transform unit 41-1. As shown in FIG. 16, the Hough transform unit 41-1 receives the outline binary image data, "center 1" that indicates the central angle of an angular range within which the Hough transform is carried out, "range 1" that indicates the angular range within which the Hough transform is carried out, and "step 1" that indicates an angular step by which the Hough transform is carried out.

Figure 18A:
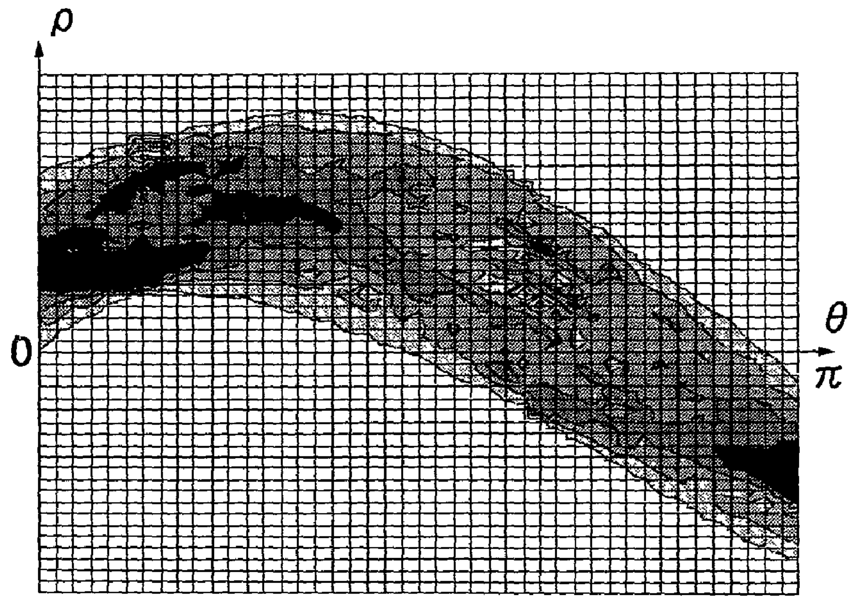
FIG. 18A and FIG. 18B are charts illustrating one example of data stored in a Hough space data storage.

The Hough transform unit 41-1 executes the Hough transform to the HIGH pixels of the inputted outline binary image data, by each step 1, within the range of center $\mathbf{1}-$range $\mathbf{1} \leqq \theta <$ center $\mathbf{1}+$range 1, and creates the Hough space data (histogram), as shown in FIG. 18A, in the Hough space memory inside the Hough space data storage 44. Here, as the foregoing values, center $\mathbf{1}=\pi/2$, range $\mathbf{1}=\pi/2$, and step $\mathbf{1}=5\pi/180$ are used. The processing by the Hough transform unit 41-1 is the same as that by the Hough transform unit 41, and explanation will be omitted.

Figure 18B:
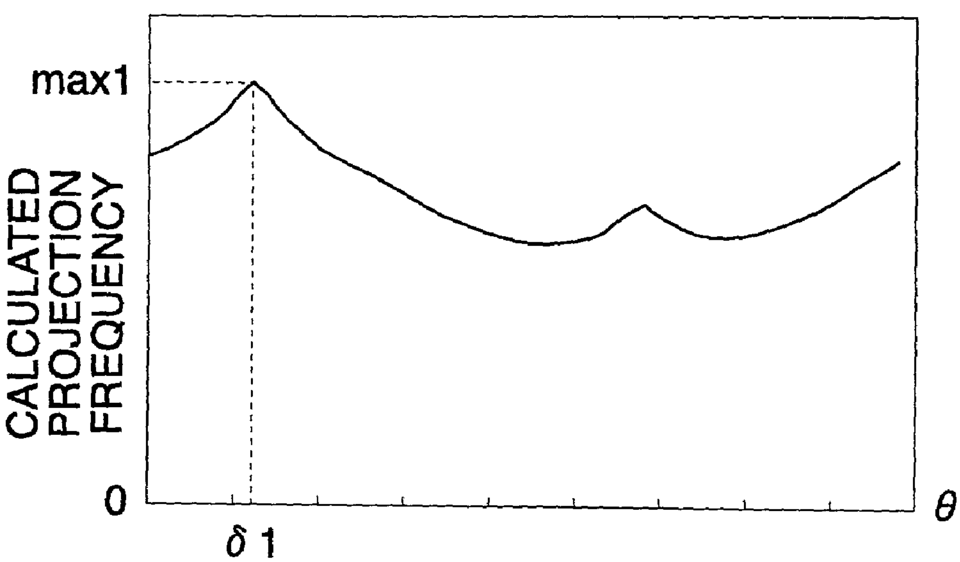

The Hough space data calculating/projecting unit 42-1 sequentially reads out the Hough space data (histogram) stored in the Hough space memory inside the Hough space data storage 44, applies a specific calculation to the read out, thereafter stores the result in the calculated projection data storage 45, and creates the calculated projection histogram data, as shown in FIG. 18B, in the calculated projection memory inside the calculated projection data storage 45. The processing by the Hough space data calculating/projecting unit 42-1 is the same as the one by the Hough space data calculating/projecting unit 42, and explanation will be omitted.

The angle detector 43-1 detects the angle $\delta\mathbf{1}$ that maximizes the calculated projection frequency from the calculated projection histogram data, as shown in FIG. 18B, and outputs the detected angle $\delta\mathbf{1}$ to the Hough transform unit 41-2. The processing by the angle detector 43-1 is the same as that by the angle detector 43, and explanation will be omitted. Thus, the Hough transform is carried out by a coarse angular step to the reduced outline binary image data, whereby the approximate value $\delta\mathbf{1}$ of the first skew angle is attained.

The outline binary image data inputted to the skew angle detector 13 is inputted to the reduction unit 46-2 as well. The reduction unit 46-2 executes the reduction of the inputted outline binary image data in order to reduce the calculation volume and the memory capacity required, when the approximate value of the second skew angle is calculated in the subsequent-stage Hough transform unit 41-2, Hough space data storage 44, Hough space data calculating/projecting unit 42-2, calculated projection data storage 45, and angle detector 43-2.

Figure 19A:
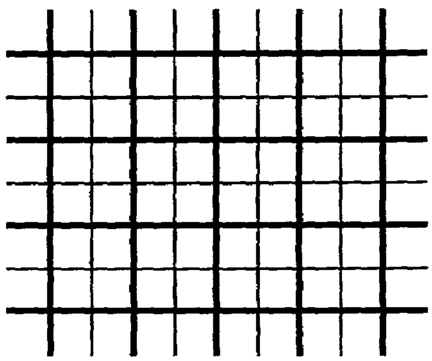
FIG. 19A to FIG. 19D are charts explaining the processing contents of the other reduction unit in the skew angle detector relating to the second embodiment.
Figure 19B:
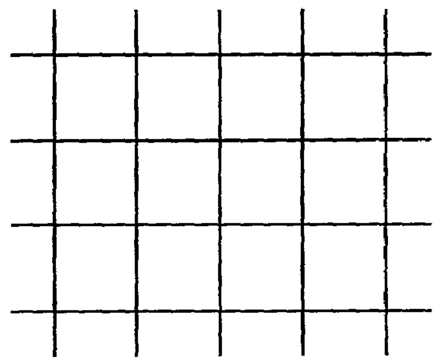
Figure 19C:
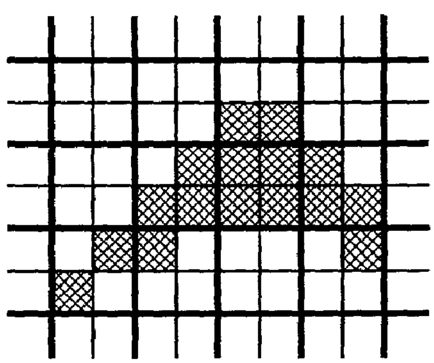
Figure 19D:
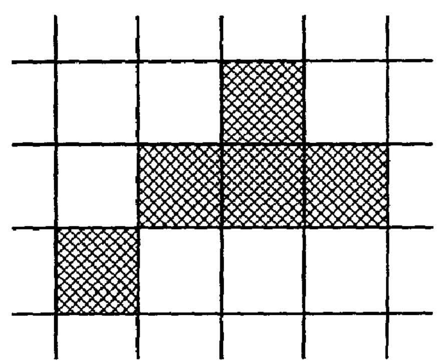

As a method of reducing the data, for example, as shown in FIG. 19A, the image is divided into plural 2×2 pixel matrixes, and each of the 2×2 pixel matrixes is assigned as one pixel after the reduction as shown in FIG. 19B. In that case, if the number of the HIGH pixels exceeds a specific threshold in the 2×2 pixels=4 pixels, the pixel after the reduction is converted into HIGH; if the number of the HIGH pixels does not exceed the specific threshold, the pixel after the reduction is converted into LOW. As the threshold, for example, 4 pixels/2=2 pixels is suitable. In this case, if the image as shown in FIG. 19C is inputted, the image as shown in FIG. 19D is outputted from the reduction unit 46-2.

The reduced binary image data outputted from the reduction unit 46-2 is inputted to the Hough transform unit 41-2. The Hough transform unit 41-2 receives the reduced binary image data, the approximate value $\delta\mathbf{1}$ of the first skew angle outputted from the angle detector 43-1, "range 2" that indicates the angular range within which the Hough transform is carried out, and "step 2" that indicates an angular step by which the Hough transform is carried out.

Figure 20A:
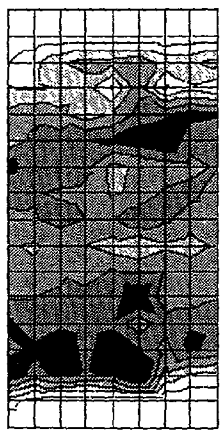
FIG. 20A to FIG. 20D are charts illustrating one example of data stored in the calculated projection data storage.

The Hough transform unit 41-2 executes the Hough transform to the HIGH pixels of the reduced outline binary image data, by each step 2, within the range of $\delta\mathbf{1}-$range $\mathbf{2} \leqq \theta < \delta\mathbf{1}+$range 2, and creates the Hough space data (histogram) as shown in FIG. 20A in the Hough space memory inside the Hough space data storage 44. Here, if the foregoing values do not meet the relation, 0<range 2<range 1, 0<step 2 21 step 1, they do not bear any significance; for example, range $\mathbf{2}=$step $\mathbf{1}=5\pi/180$, step $\mathbf{2}=\pi/180$, and the like are used. The processing by the Hough transform unit 41-2 is the same as that by the Hough transform unit 41, and explanation will be omitted.

Figure 20C:
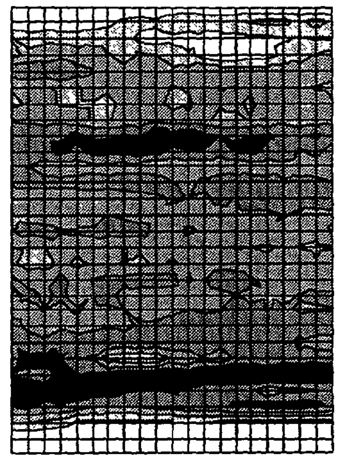
Figure 20B:
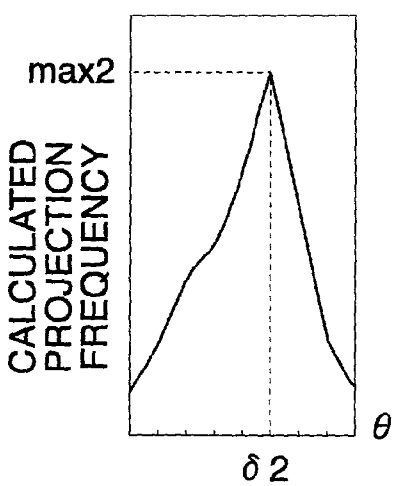

The Hough space data calculating/projecting unit 42-2 sequentially reads out the Hough space data (histogram) stored in the Hough space memory inside the Hough space data storage 44, applies a specific calculation to the data, thereafter stores the result in the calculated projection data storage 45, and creates the calculated projection histogram data, as shown in FIG. 20B, in the calculated projection memory inside the calculated projection data storage 45. The processing by the Hough space data calculating/projecting unit 42-2 is the same as that by the Hough space data calculating/projecting unit 42, and explanation will be omitted.

The angle detector 43-2 detects the angle $\delta\mathbf{2}$ that maximizes the calculated projection frequency from the calculated projection histogram data, as shown in FIG. 20B, and outputs the detected angle $\delta\mathbf{2}$ to the Hough transform unit 41-3. The processing by the angle detector 43-2 is the same as that by the angle detector 43, and explanation will be omitted. Thus, the Hough transform is carried out by a coarse angular step to the reduced outline binary image data, whereby the approximate value $\delta\mathbf{2}$ of the second skew angle is attained.

The outline binary image data inputted to the skew angle 13 are also inputted to the Hough transform unit 41-3. The Hough transform unit 41-3 receives the outline binary image data, the approximate value $\delta\mathbf{2}$ of the second skew angle outputted from the angle detector 43-2, "range 3" that indicates the angular range within which the Hough transform is carried out, and "step 3" that indicates an angular step by which the Hough transform is carried out.

The Hough transform unit 41-3 executes the Hough transform to the HIGH pixels of the inputted outline binary image data, by each step 3, within the range of δ2−range 3≦θ<δ2+range 3, and creates the Hough space data (histogram) as shown in FIG. 20C, in the Hough space memory inside the Hough space data storage 44. Here, if the foregoing values do not meet the relation, 0<range 3<range 2, 0<step 3<step 2, they do not bear any significance; for example, range 3=step 2=π/180, step 3=π/1800, and the like are used. The processing by the Hough transform unit 41-3 is the same as that by the Hough transform unit 41, and explanation will be omitted.

Figure 20D:
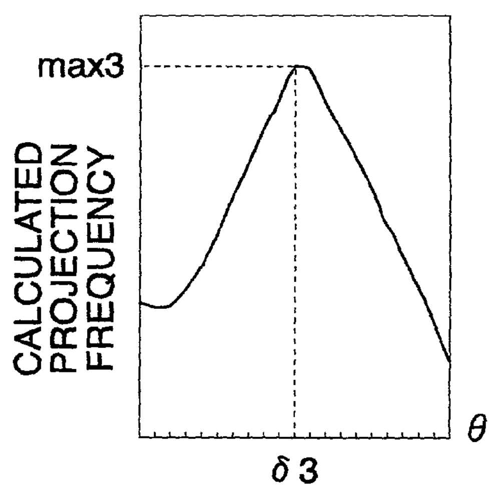

The Hough space data calculating/projecting unit 42-3 sequentially reads out the Hough space data (histogram) stored in the Hough space memory inside the Hough space data storage 44, applies a specific calculation to the read out, thereafter stores the result in the calculated projection data storage 45, and creates the calculated projection histogram data as shown in FIG. 20D, in the calculated projection memory inside the calculated projection data storage 45. The processing by the Hough space data calculating/projecting unit 42-3 is the same as the one by the Hough space data calculating/projecting unit 42, and the explanation will be omitted.

The angle detector 43-3 detects the angle δ3 that maximizes the calculated projection frequency from the calculated projection histogram data as shown in FIG. 20B, and outputs the angle δ3 as the result detected by the skew angle detector 13. The processing by the angle detector 43-3 is the same as that by the angle detector 43, and explanation will be omitted.

As described above, the Hough transform is executed to the outline binary image data reduced by a large scaling factor with a wide range of angle and a coarse step of angle to calculate the approximate value of the first skew angle; next, the Hough transform is executed to the outline binary image data reduced by a small scaling factor with a narrower range of angle and a finer step of angle to calculate the approximate value of the second skew angle; and, the Hough transform is executed to the outline binary image data with an even narrower range of angle and an even finer step of angle, whereby a high-speed and high-accuracy detection of the skew angle can be achieved with less processing quantity and less memory capacity.

The detection of the skew angle in this embodiment is carried out with the three-stage configuration to calculate from the approximate value through the detailed value; however the configuration may be of two stages or four stages.

Further, this embodiment provides the skew angle detector 13 with two reduction units, three Hough transform units, three Hough space data calculating/projecting units, and three angle detectors; however, it may be configured with one each, such that each processing is executed by varying the parameters.

According to the image processing device and the processing method thereof, relating to the second embodiment of the invention, as described above, with regard to the image in which characters, line drawings, photographs, and dots, etc., are intermingled, without extracting the pixels contained in the photographic and halftone dot regions that behave as noises in detecting the skew angle, the method extracts the outline image appropriately to carry out the Hough transform, executes a specific calculation that allows detecting the crowding from the Hough space data to project the calculation result in the projection histogram, and provides the processing with multiple stages that detects the skew angle from this histogram projected, whereby it becomes possible to detect and correct the skew angle with high speed and high accuracy, regardless of the type of the input image.

<Third Embodiment>

Next, an image processing device relating to the third embodiment of the invention will be described. Here, in the following description, the processing units of the same processing contents as in the first and second embodiments are given the same numerical symbols, and the explanations thereof will be omitted. That is, in the image processing device relating to the third embodiment, since the configuration of the image processing device shown in FIG. 1 is the same as those in the first and second embodiments, explanation here will be omitted, and a skew correction unit will be described which has a different configuration from those in the first and second embodiments and bears a characteristic configuration.

Figure 21:
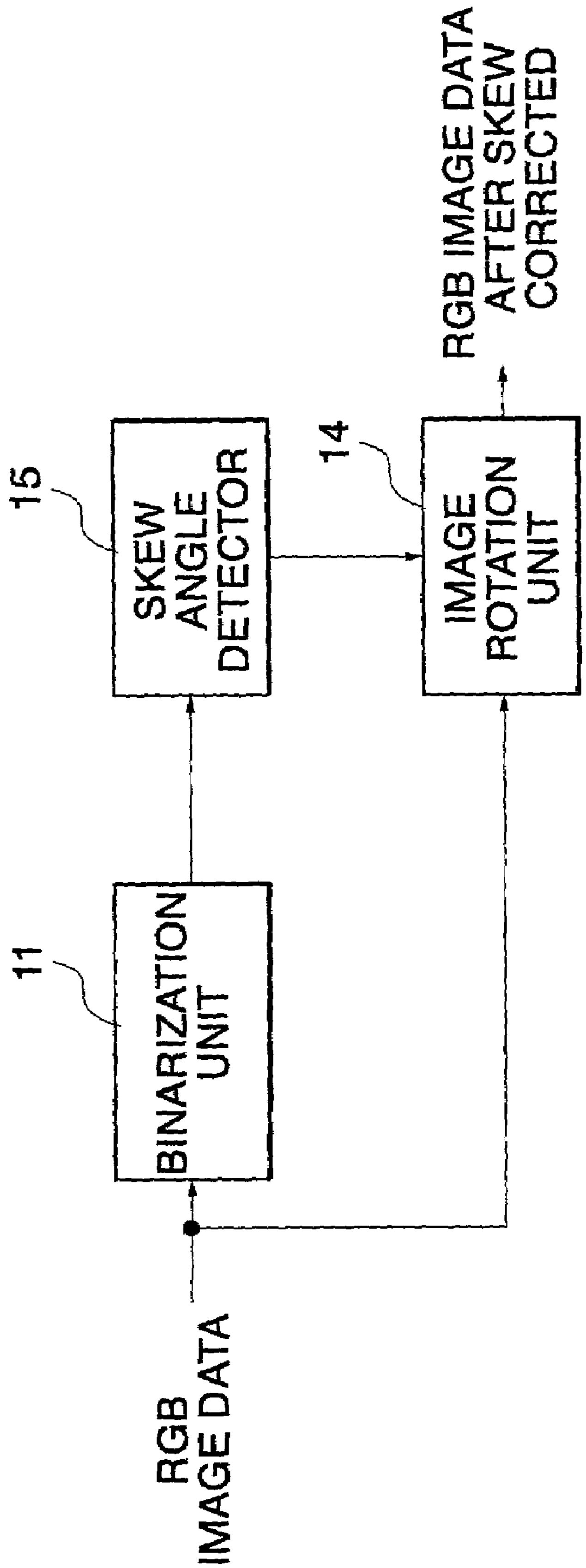
FIG. 21 is a block diagram illustrating a configuration of the skew correction unit relating to the third embodiment of the invention.

FIG. 21 is a block diagram illustrating a configuration of the skew correction unit in the image processing device relating to the third embodiment of the invention. In FIG. 21, the RGB image data inputted to the skew correction unit is inputted to the binarization unit 11 and the image rotation unit 14.

The binarization unit 11 converts the inputted RGB image data into binary image data by binarizing the pixels 1bit belonging to the foreground region contained in the image, such as, characters, lines, patterns, photographs as HIGH, and the pixels belonging to the background region as LOW. The binarization unit 11 has already been described in detail, and explanation here will be omitted. The binary image data outputted from the binarization unit 11 is inputted to a skew angle detector 15. The skew angle detector 15 calculates the skew angle of the image data, using the inputted binary image data. The skew angle detector 15 will be described in detail.

The skew angle detected by the skew angle detector 15 is inputted to the image rotation unit 14. The image rotation unit 14 also receives the RGB image data, and corrects the skew of the RGB image data on the basis of the skew angle detected by the skew angle detector 15. As an image rotation method, for example, a well-known method using the Affine transform or the like can be employed. The RGB image data after the skew is corrected is outputted as a skew correction result by the skew correction unit.

Figure 22:
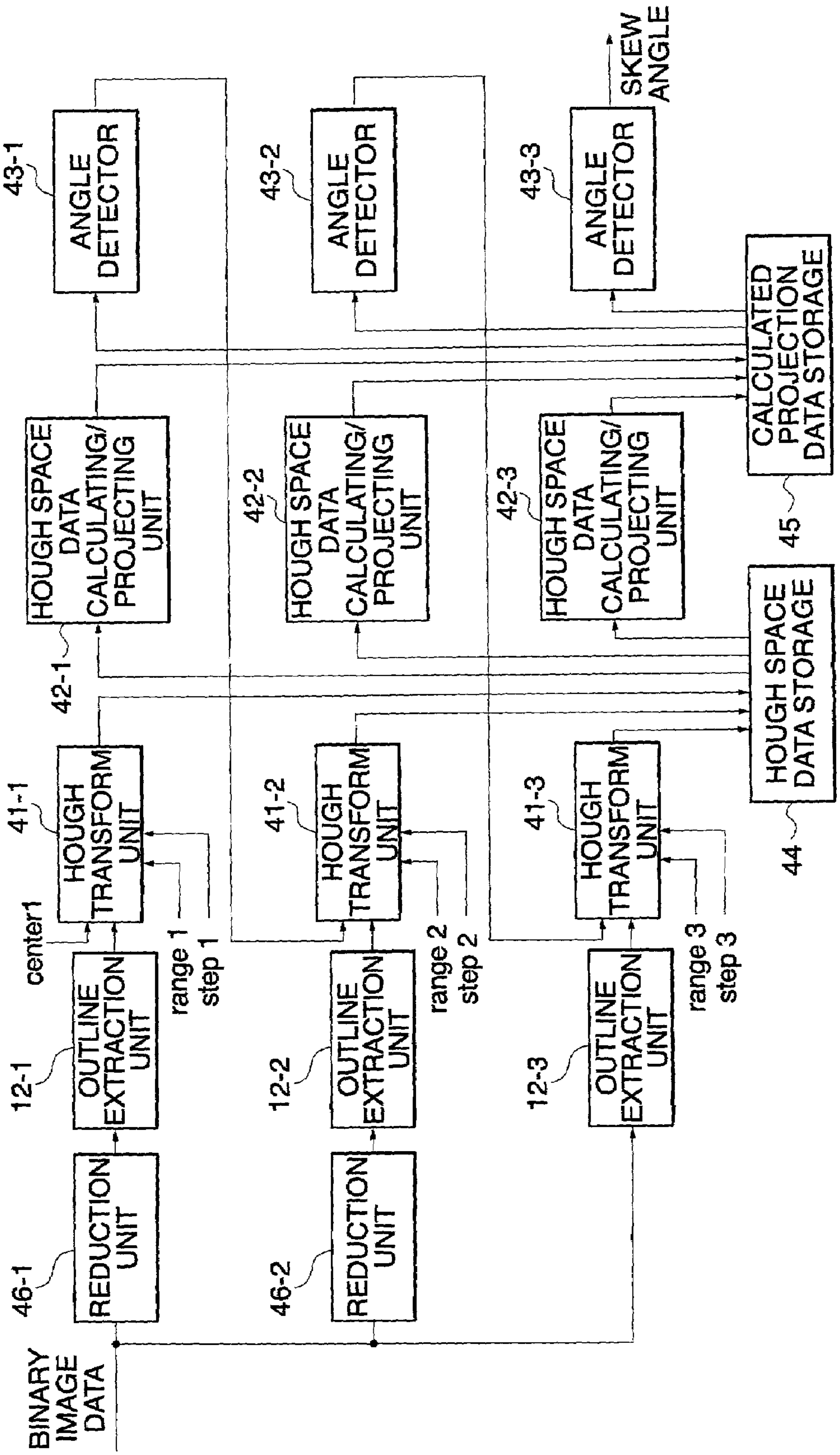
FIG. 22 is a block diagram illustrating a configuration of the skew angle detector in the skew correction unit relating to the third embodiment.

Next, the skew angle detector 15 will be detailed with reference to FIG. 22. The binary image data inputted to the skew angle detector 15 is inputted to the reduction units 46-1 to 46-2 and an outline extraction unit 12-3. The reduction unit 46-1 carries out the reduction processing of the inputted binary image data, and outputs the reduced binary image data to an outline extraction unit 12-1. The reduction unit 46-1 has already been described, and explanation here will be omitted.

The outline extraction unit 12-1 extracts the outline of a HIGH pixel group of the reduced binary image data inputted from the reduction unit 46-1, and creates outline binary image data to output to the Hough transform unit 41-1. The processing by the outline extraction unit 12-1 is the same as that by the outline extraction unit 12, which has already been described in detail, and explanation here will be omitted.

Thus, the third embodiment carries out the reduction processing to the binary image data first, and thereafter executes the outline extraction processing to the image having the reduction processing applied, which is different from the second embodiment that executes the outline extraction processing before carrying out the reduction processing. Thereby, the photographic and dot regions and the like that could not be binarized as continuous HIGH pixels in the binarization of the image data by the binarization unit 11 can be inverted into continuous HIGH pixel regions by the reduction processing being carried out first. By executing outline processing to the region, it becomes possible to prevent extraction of outlines unnecessary for detecting skew angles. That is, detection of skew angles at high speed, with a smaller memory capacity and with high accuracy becomes possible.

The processing contents and configurations of the reduction unit 46-2, outline extraction units 12-2 to 12-3, Hough transform units 41-1 to 41-3, Hough space data storage 44, Hough space data calculating/projecting units 42-1 to 42-3, calculated projection data storage 45, and angle detectors 43-1 to 43-3, other than the aforementioned, are the same as in the second embodiment, and explanations here will be omitted.

According to the image processing device and the processing method relating to the third embodiment of the invention, as described above, with regard to the image in which characters, line drawings, photographs, and dots, etc., are intermingled, without extracting the pixels contained in the photographic and halftone dot regions that behave as noises in detecting the skew angle, the method extracts the outline image appropriately to carry out the Hough transform, executes a specific calculation that allows detecting the crowding from the Hough space data to project the calculation result in the projection histogram, and carries out the processing that detects the skew angle from this histogram projected, whereby it becomes possible to detect and correct the skew angle with high speed and high accuracy, regardless of the type of the input image.

<Fourth Embodiment>

Next, an image processing device relating to the fourth embodiment of the invention will be described. Here, in the following description, the processing units of the same processing contents as in the first and second embodiments are given the same numerical symbols, and explanation thereof will be omitted. That is, in the image processing device relating to the fourth embodiment, since the configuration of the image processing device shown in FIG. 1 and the configuration of the skew correction unit 5 shown in FIG. 2 are the same as those in the first and second embodiments, explanation here will be omitted, and a skew angle detector will be described which has a different configuration from the second embodiment and bears a characteristic configuration.

Figure 23:
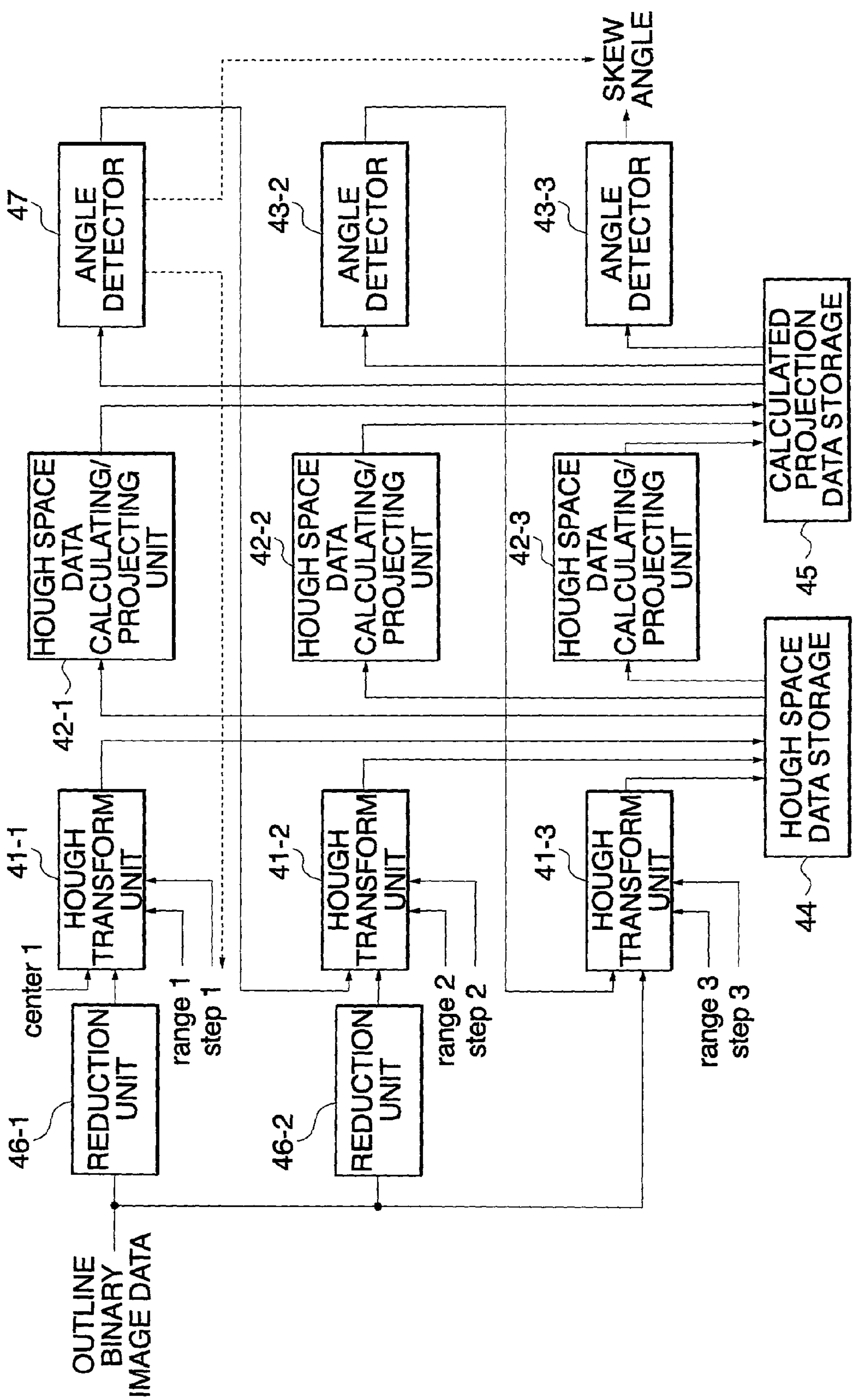
FIG. 23 is a block diagram illustrating a configuration of the skew angle detector relating to the fourth embodiment of the invention.

FIG. 23 is a block diagram illustrating a configuration of the skew angle detector in the image processing device relating to the fourth embodiment of the invention. When compared with the skew angle detector in the second embodiment illustrated in FIG. 16, the skew angle detector in this embodiment in FIG. 23 differs only in an angle detector 47 in terms of the processing contents and configurations; and the angle detector 47 will be described in detail here, and the others will be omitted.

The processing by the angle detector 47 will be described with reference to FIG. 24 and FIG. 25. The angle detector 47 reads out calculated projection histogram data from the calculated projection data storage 45, applies specific processing, thereafter detects an angle that gives the maximum frequency to the histogram, and outputs the detected angle to the Hough transform 41-2.

Figure 24A:
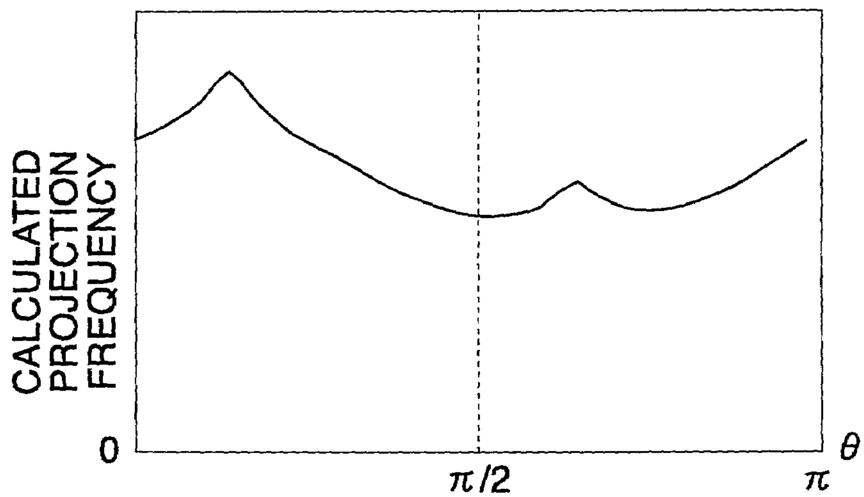
FIG. 24A and FIG. 24B are charts explaining the processing contents of an angle detector.
Figure 25:
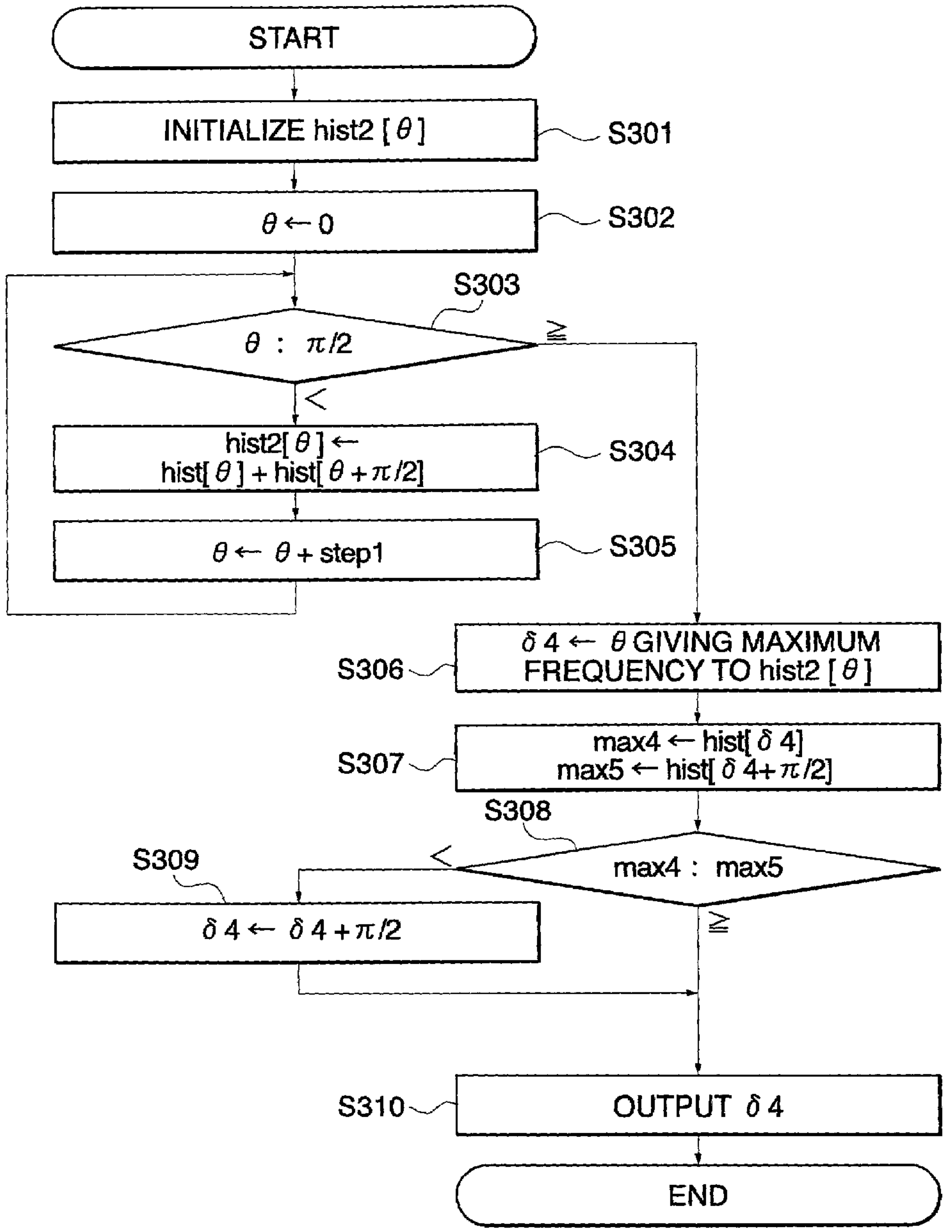
FIG. 25 is a flowchart illustrating the processing flow of the angle detector.

FIG. 24A illustrates one example of the calculated projection histogram data stored in the calculated projection memory inside the calculated projection data storage 45. As shown in FIG. 24A, the calculated projection histogram data (hist [θ]) is assumed to be created within the range of $0 \leqq \theta < \pi$, and stored.

As shown by the flowchart in FIG. 25, first, in the angle detector 47, step S301 initializes the calculated projection memory (hist 2 [θ]) that stores the calculation result to the calculated projection histogram data described later. Next, step S302 divides the calculated projection histogram data within the range of $0 \leqq \theta < \pi$ into the two pieces of calculated projection histogram data within the range of $0 \leqq \theta < \pi/2$ and within the range of $\pi/2 \leqq \theta < \pi$, and substitutes "0" for θ in order to add the frequencies corresponding to these ranges each.

Figure 24B:
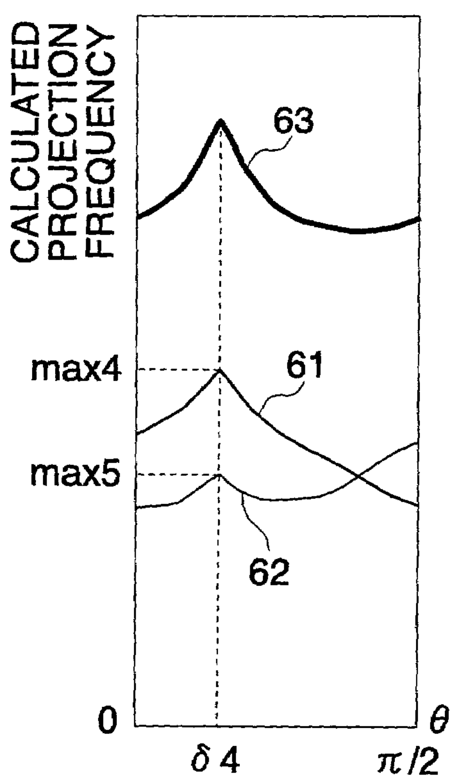

FIG. 24B illustrates the two divided calculated projection histogram data, in which the curve 61 shows the calculated projection histogram data within the range of $0 \leqq \theta < \pi/2$, and the curve 62 shows the calculated projection histogram data within the range of $\pi/2 \leqq \theta < \pi$. Here, in FIG. 24B, the curve 62 is illustrated with the phase shift of $\pi/2$.

Next, step S303 compares the angle θ with $\pi/2$; if it shows $\theta < \pi/2$, step S304 adds the frequencies of the calculated projection histogram data at θ and $\theta + \pi/2$, and substitutes the added result for hist 2 [θ]. And, step S305 increases the angle θ by an increment of step 1. Here, the step 1 is the same as one explained in the second embodiment, which is the same value as the angle step when the Hough transform 41-1 carries out the Hough transform.

That is, in the steps S302 to S305, the calculated projection histogram data (first calculated frequency data) within the range of $0 \leqq \theta < \pi$ is divided into the two calculated projection histogram data corresponding to the ranges of $0 \leqq \theta < \pi/2$ and $\pi/2 \leqq \theta < \pi$, and one of the divided two histogram data pieces, namely, the curve 62 is phase-shifted by $\pi/2$ in adding the frequency, and a new calculated projection histogram (hist 2 [θ]) is created. The curve 63 in FIG. 24B shows the added calculated projection histogram data (second calculated frequency data).

On the other hand, the comparison result at step S303 shows $\theta \geqq \pi/2$, step S306 finds out the angle θ at which hist 2 [θ] attains the maximum frequency, and substitutes the angle θ for δ4. The next step S307 calculates the frequencies at δ4 and δ4+π/2, in the original calculated projection histogram data (hist [θ]), and substitutes the calculated frequencies for max 4 and for max 5. That is, in FIG. 24B, the frequencies at δ4 of the curve 61 and the curve 62, max 4 and max 5 are calculated.

Next, step S308 compares max 4 with max 5, and if it finds max 5 larger than max 4, step S309 increases δ4 by an increment of π/2. On the other hand, if it finds max 4 larger than or equal to max 5, the step advances to step S310, and the angle detector 47 outputs δ4 as the detection angle finally, in the same manner as the case of terminating the processing at step S309.

Thus, the angle detector 47 carries out a series of the above processing, and executes the Hough transform to the reduced outline binary image data by a coarse step of angle to thereby attain the approximate value (δ4) of the fourth skew angle.

Figure 26:
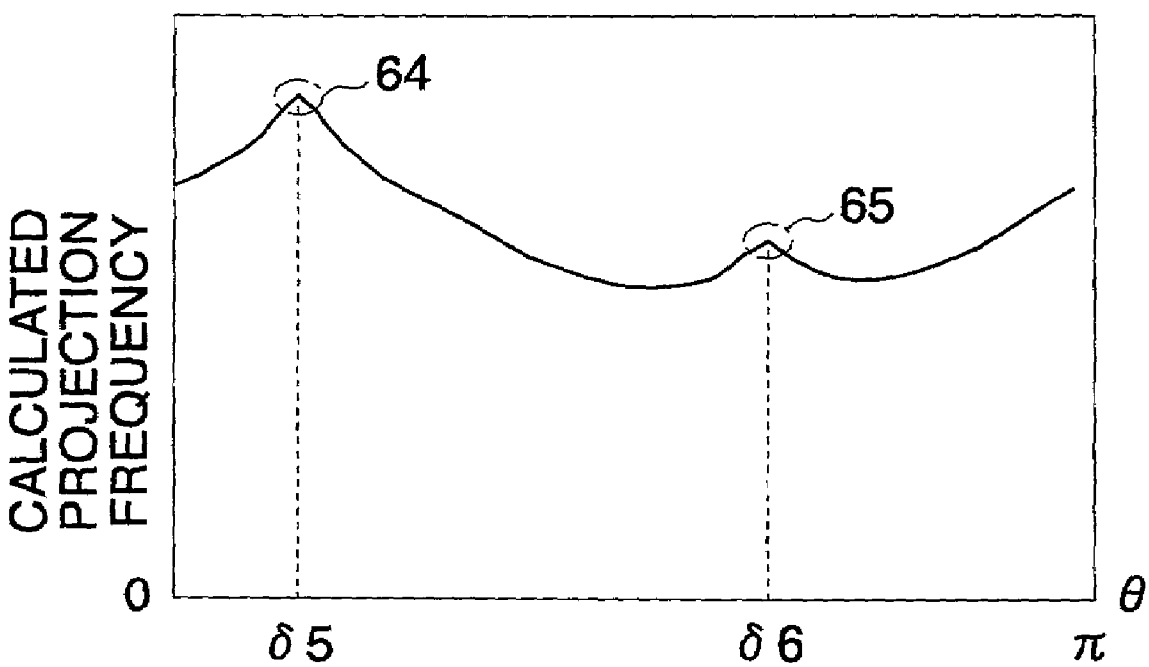
FIG. 26 is a chart explaining other processing contents of the angle detector.

Next, another example of the processing by the angle detector 47 will be explained with reference to FIG. 26. FIG. 26 shows another example of the calculated projection histogram data stored in the calculated projection memory inside the calculated projection data storage 45. The angle detector 47 finds out, from the calculated projection histogram data, the point where the frequency becomes the largest (the larger maximal frequency), namely, the maximal value 64 in FIG. 26, and the point where the frequency becomes the second large, namely, the maximal value 65 in FIG. 26.

Next, the angle detector 47 calculates angles each giving the maximal frequencies, namely, an angle δ5 and an angle δ6 in FIG. 26. If the difference between the angle δ5 and the angle δ6 is close to π/2, the angle detector outputs the angle δ5 as a detection angle. If it is not close to π/2, the configuration may be modified such that the angle detector 47, using a signal line illustrated by the dotted lines in FIG. 23, varies the value of "step 1", etc., inputted to the Hough transform unit 41 so as to execute the Hough transform processing from the Hough transform unit 41-1 again, or outputs a signal indicating the impossibility of detecting a skew angle.

That is, by taking on the configuration thus modified, it becomes possible to judge the accuracy of the skew angle approximately attained, and if judged inaccurate, to vary the parameter and detect a new approximate skew angle, which is more accurate.

In the above description, since the calculated projection histogram data is created within the range of $0 \leqq \theta < \pi$, generally the histogram does not take the maximal value at θ=0 and step 1×i (step 1×i: the maximum value smaller than π, i: integer); however, in this invention, hist [0]=hist [π] is presumed, and when, for example, hist [0]>hist [step 1] and hist [0]>hist [step 1×i] is the case, hist [0] is defined as the maximal value.

Further, in the above description, the two angles that give the maximal frequencies are calculated, and the accuracy of the detected approximate skew angle is judged on the basis of the difference of the two angles; however in reverse, the configuration may be modified to calculate the angle that gives the largest frequency (the larger maximal frequency), and to judge whether there is a maximal point near an angle obtained by adding (or subtracting) π/2 to the angle giving the largest frequency, so as to judge the accuracy of the approximate skew angle detected.

According to the image processing device and the processing method relating to the fourth embodiment of the invention, as described above, with regard to the image in which characters, line drawings, photographs, and dots, etc., are intermingled, without extracting the pixels contained in the photographic and halftone dot regions that behave as noises in detecting the skew angle, the method extracts the outline image appropriately to carry out the Hough transform, executes a specific calculation that allows detecting the crowding from the Hough space data to project the calculation result in the projection histogram, provides the processing with multiple stages that detects the skew angle from this histogram projected, and executes the judgment of detection accuracy in the course of the coarsest detection processing of the appropriate skew angle, whereby it becomes possible to detect and correct the skew angle with high speed and high accuracy, regardless of the type of the input image.

<Fifth Embodiment>

Next, an image processing device relating to the fourth embodiment of the invention will be described. Here, in the following description, the processing units of the same processing contents as in the first embodiment are given the same numerical symbols, and explanation thereof will be omitted. That is, in the image processing device relating to the fifth embodiment, since the configuration of the image processing device shown in FIG. 1 is the same as in the first embodiment, explanation here will be omitted, and a skew correction unit will be described which has a different configuration from the first embodiment and bears a characteristic configuration.

Figure 27:
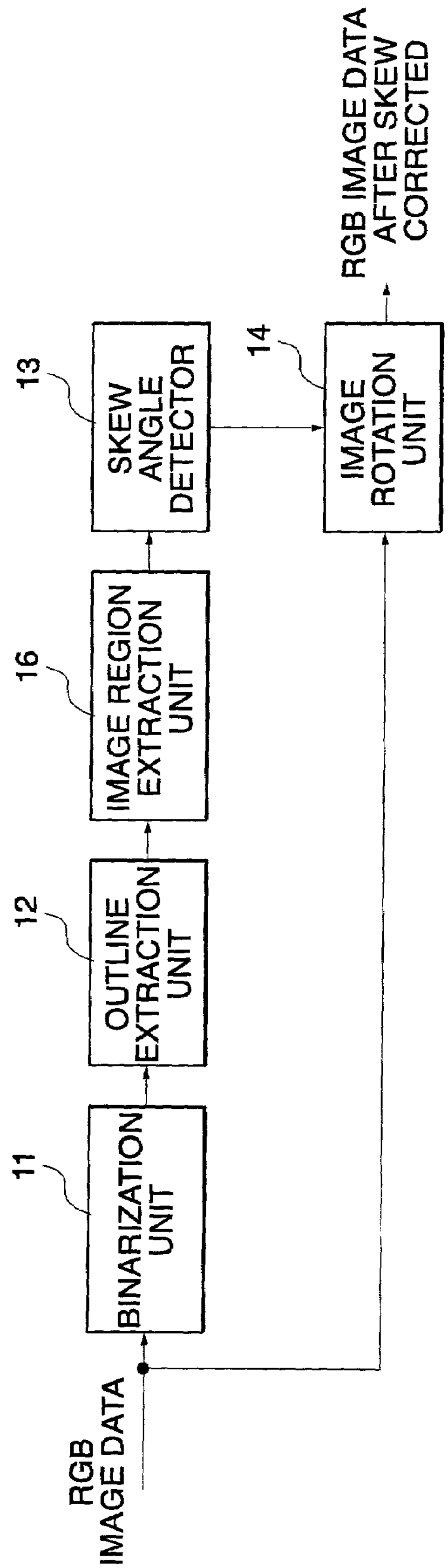
FIG. 27 is a block diagram illustrating a configuration of the skew correction unit relating to the fifth embodiment.

FIG. 27 is a block diagram illustrating a configuration of the skew correction unit in the image processing device relating to the fifth embodiment of the invention. In FIG. 27, the image data (RGB image signal of 8 bits for each pixel and the resolution 400 dpi) inputted to the skew correction unit is inputted to the binarization unit 11 and the image rotation unit 14. The binarization unit 11 converts the inputted RGB image data into binary image data by binarizing the pixels belonging to the foreground region contained in the image, such as, characters, lines, patterns, photographs as HIGH, and the pixels belonging to the background region as LOW. The binarization unit 11 has already been described in detail, and explanation here will be omitted.

The binary image data outputted from the binarization unit 11 are inputted to the outline extraction unit 12. The outline extraction unit 12 extracts the outlines of the HIGH pixels contained in the binary image data inputted, and creates the outline binary image data of the outline pixels extracted. The outline extraction unit 12 is already explained in detail, and explanation here will be omitted. The outline binary image data outputted from the outline extraction unit 12 is inputted to an image region extraction unit 16. The image region extraction unit 16 extracts (cuts out) a specific region from the outline binary image data inputted thereto, and creates partially extracted outline binary image data. The image region extraction unit 16 will be detailed later.

The partially extracted outline binary image data outputted from the image region extraction unit 16 is inputted to the skew angle detector 13. The skew angle detector 13, using the partially extracted outline binary image data inputted thereto, calculates the skew angle of the image data. The skew angle detector 13 is already detailed, and the explanation here will be omitted.

The skew angle detected by the skew angle detector 13 is inputted to the image rotation unit 14. The image rotation unit 14 also receives the RGB image data, and corrects the skew of the RGB image data on the basis of the skew angle detected by the skew angle detector 13. As an image rotation method, for example, a well-known method using the Affine transform or the like can be employed. The RGB image data after the skew is corrected is outputted as a skew correction result by the skew correction unit 5.

Figure 28A:
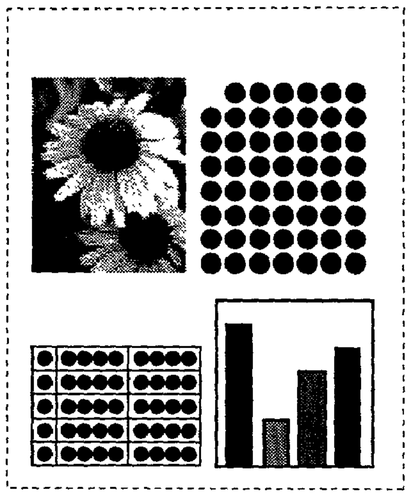
FIG. 28A to FIG. 28D are charts (No. 1) illustrating the processing contents of an image region extraction unit in the skew correction unit relating to the fifth embodiment.
Figure 28B:
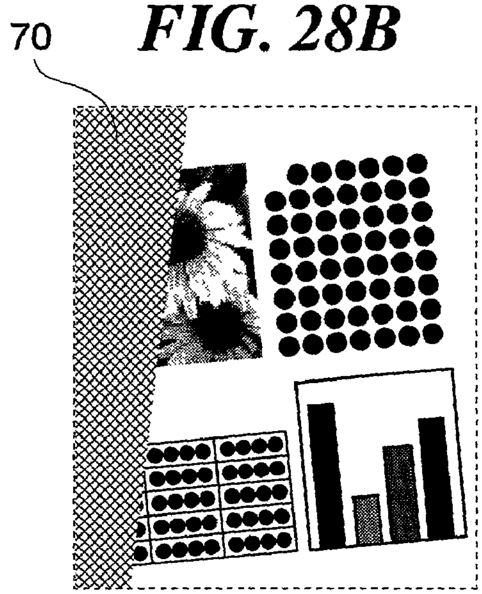

Next, the processing by the image region extraction unit 16 will be detailed with reference to FIG. 28 and FIG. 29. When a scanner reads a copy image as shown in FIG. 28A, for example, which is printed on a book or on a magazine, there is a possibility such that a part of the binding margin is not completely fixed to the contact glass of the scanner and floats from the glass. In such a case, the scanner can input image data, as shown in FIG. 28B, in which a part of the image (region 70 in FIG. 28B) becomes blackish.

Figure 28C:
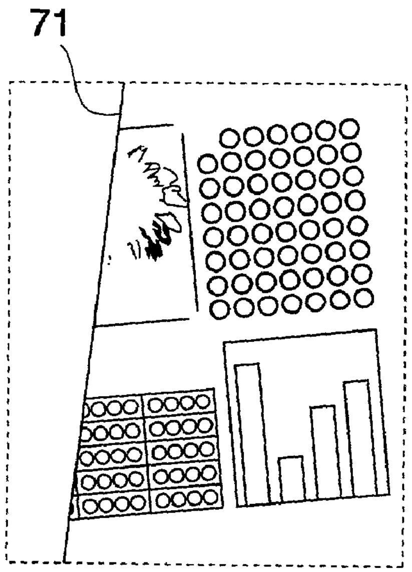
Figure 29A:
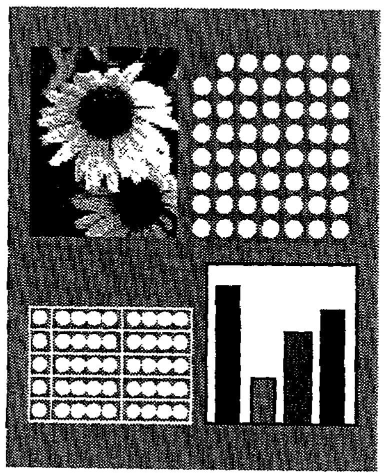
FIG. 29A to FIG. 29D are charts (No. 2) illustrating the processing contents of the image region extraction unit in the skew correction unit relating to the fifth embodiment.
Figure 29B:
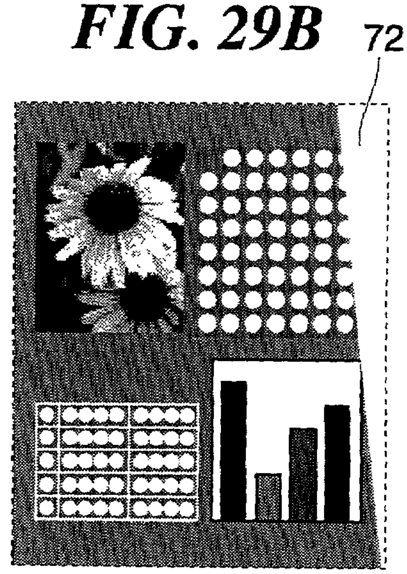

Or, when the scanner reads a copy image with a deep colored background, as shown in FIG. 29A, which is the first page of a book or a magazine, and when this page is cut slant, the scanner inputs image data, as shown in FIG. 29B, in which a part of the image (region 72 in FIG. 29B) becomes whitish. And, the binarization processing by the binarization unit 11 and the outline extraction processing by the outline extraction unit 12 are carried out to the image data as shown in FIG. 28B and FIG. 29B, which creates the outline binary image data as shown in FIG. 28C and FIG. 29C.

Figure 29C:
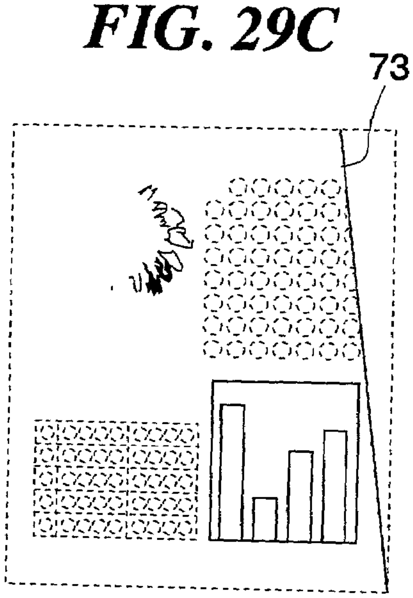

However, when the skew angle detection is carried out to the outline binary image data as shown in FIG. 28C and FIG. 29C, there are long line segments (the line segment 71 in FIG. 28C and the line segment 73 in FIG. 29C) that are not vertical or not horizontal to the actual copy, which will make it impossible to detect a correct skew angle.

Figure 28D:
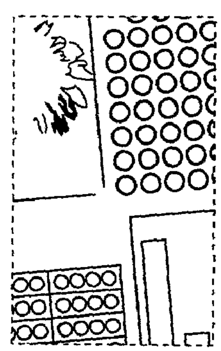
Figure 29D:
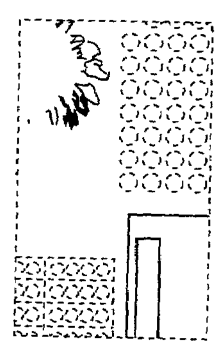

Accordingly, the image region extraction unit 16 cuts out a region where the correct skew angle can be detected, from the outline binary image data inputted thereto, and outputs the partially extracted outline binary image data to the skew angle detector 13. That is, the central image regions that have few components to cause error detection are extracted, as shown in FIG. 28D and FIG. 29D.

Further, although not illustrated, the skew correction unit may be configured to divide the inputted outline binary image data into plural regions, to output each of the regions or some of the regions sequentially from the image region extraction unit 16, to make the skew angle detector 13 execute skew angle detection to the plural regions, and to attain the final skew angle on the basis of the angles detected for each of the regions, whereby, the accuracy of the skew angle can be enhanced.

Further, the skew detection unit of the fifth embodiment positions the image region extraction unit 16 on the second stage of the outline extraction unit 12 (on the first stage of the angle detector 13), however it is not limited to this configuration. For example, the image region extraction unit 16 may be configured on the first stage of the binarization unit 11 or on the second stage of the binarization unit 11 (on the first stage of the outline extraction unit 12).

According to the image processing device and the processing method relating to the fifth embodiment of the invention, as described above, with regard to the image in which characters, line drawings, photographs, and dots, etc., are intermingled, of which periphery is distorted due to a slant cutting of a copy, or due to a floating of the copy from the contact glass of a scanner during reading an image of a book or magazine, without extracting an inappropriate periphery of the image and the pixels contained in the photographic and halftone dot regions that behave as noises in detecting the skew angle, the method extracts the outline image appropriately to carry out the Hough transform, executes a specific calculation that allows detecting the crowding from the Hough space data to project the calculation result in the projection histogram, and detects the skew angle from this histogram projected, whereby it becomes possible to detect and correct the skew angle with high accuracy, regardless of the type of the input image.

An image processing program that makes a computer execute the processing operations of the image processing methods relating to the first through the fifth embodiments, as described above, is stored in a recording medium such as a floppy disk, CD-ROM, DVD-ROM as software. The image processing program stored in the recording medium is read by the computer as needed, and is installed in a memory inside the computer for use. And, the processing operations of the image processing methods relating to the first through the fifth embodiments, specifically, the skew angle detection of the document images is to be carried out on the basis of the image processing program installed.

Further, in the descriptions of the above embodiments, each of the image processing devices is provided with the image rotation unit 14 that corrects a skew of an image on the basis of the skew angle that is detected by the skew angle detector 13; however, the image rotation unit 14 is not always required, and the embodiments are applicable to image processing devices in general with a unit equivalent to the skew angle detector 13.

As the embodiments being thus described, the method according to the invention extracts the optimum pixels for detecting the skew angle of a skewed image created during reading the image, with regard to the image in which characters, line drawings, photographs, and dots, etc., are intermingled, and carries out the angle detection on the basis of the extracted pixels on the whole situation, which permits a high accuracy skew correction regardless of the type of the input image.

The entire disclosure of Japanese Patent Application No. 2000-271212 filed on Sep. 7, 2000 including specification, claims, drawings and abstract is incorporated herein by reference in its entirety.

What is claimed is:

1. An image processing device comprising:

a binary image generating part that generates binary image data from inputted image data;

a Hough transform part that executes Hough transform to the binary image data generated by the binary image generating part to generate Hough space data;

a frequency calculating part that executes a calculation to each of frequencies of a coordinate that represents distance and angle in the Hough space data, tallies the attained calculation result by each angle, and generates first frequency calculation data based on the tallied result; and an angle detecting part that calculates a skew angle of the image data inputted by an input part based on the first frequency calculation data generated by the frequency calculating part, wherein the angle detecting part detects at least two maximum values or maximal values from the first frequency calculation data, and when an angle from a difference of the angles that give the maximum values or the maximal values is about $\pi/2$ (rad), the angle detecting part detects one of the angles as the skew angle.

2. The image processing device according to claim 1, wherein the process to detect the skew angle is operated plural times, and detecting conditions are different from each other.

3. The image processing device according to claim 2, wherein the detecting conditions are varied step by step.

4. The image processing device according to claim 1, wherein:

the Hough transform part uses a surrounding frequency to smooth the frequency of the Hough space data generated, and the frequency calculating part generates the first frequency calculation data based on the frequencies of the Hough space data smoothed by the Hough transform part.

5. The image processing device according to claim 1, wherein:

the frequency calculating part uses a surrounding frequency calculation value to smooth a frequency calculation value of the first frequency calculation data generated, and the angle detecting part calculates the angle based on the frequency calculation value of the first frequency calculation data smoothed by the frequency calculating part.

6. The image processing device according to claim 1, further comprising:

a reduction part that executes reduction processing of the binary image data generated by the binary image generating part, wherein:

the Hough transform part executes the Hough transform to the binary image data reduced by the reduction part to generate the Hough space data.

7. The image processing device according to claim 1, wherein the specific calculation is related to a function of a frequency containing a term of the n-th power (n>1) of the frequency.

8. The image processing device according to claim 7, wherein n is 2.

9. The image processing device according to claim 1, wherein the angle detecting part detects a largest frequency calculation value from the first frequency calculation data generated by the frequency calculating part, and detects an angle that gives the largest frequency calculation value.

10. The image processing device according to claim 1, wherein the angle detecting part adds the first frequency calculation data generated by the frequency calculating part, with the phase shift of π/2 (rad), to generate second frequency calculation data, detects a largest frequency calculation value from the second frequency calculation data, and detects an angle that gives the largest frequency calculation value.

11. The image processing device according to claim 1, wherein the angle detecting part detects a maximal value from the first frequency calculation data generated by the frequency calculating part, and detects an angle that gives the maximal value.

12. The image processing device according to claim 1, wherein:

the binary image generating part includes a binarization part that executes binarization processing to the image data inputted by the input part, a pixel block extraction part that extracts a pixel block from binary image data generated by the binarization part, and a representative point extraction part that extracts a representative point of the pixel block extracted by the pixel block extraction part; and the skew angle is calculated based on the binary image data of the representative point of the pixel block extracted by the representative point extraction part.

13. The image processing device according to claim 12, wherein the Hough transform part executes the Hough transform to the representative point extracted by the representative point extraction part.

14. The image processing device according to claim 12, wherein:

the binary image generating part includes a reduction part that reduces the binary image data whose pixel block is extracted by the pixel block extraction part to extract a first pixel block, and the representative point extraction part extracts outline pixels from the first pixel block extracted by the reduction part.

15. The image processing device according to claim 14, wherein:

the binary image generating part includes an expansion part that expands a region of the pixel block extracted by the pixel block extraction part to extract a second pixel block, and the representative point extraction part extracts the outline pixels from the second pixel block extracted by the expansion part.

16. The image processing device according to claim 15, wherein:

the binary image generating part includes a contraction part that contracts the region of the second pixel block extracted by the expansion part to extract a third pixel block, and the representative point extraction part extracts the outline pixels from the third pixel block extracted by the contraction part.

17. The image processing device according to claim 12, wherein the binarization part is a dynamic binarization part that executes a dynamic threshold binarization processing to the image data inputted by the input part.

18. The image processing device according to claim 12, wherein:

the binary image generating part includes a halftone dot region extraction part that extracts a dot region from the image data inputted by the input part, and the representative point extraction part extracts the representative point of the pixel block from synthesized data of the image data pieces each outputted from the dynamic binarization part and the halftone dot region extraction part.

19. The image processing device according to claim 1, wherein:

the binary image generating part further includes an image region extraction part that extracts part of an image, and the skew angle is calculated based on the part of the image extracted by the image region extraction part.

20. The image processing device according to claim 1, wherein:

the binary image generating part further includes an image region partition part that partitions an image into plural regions, and plural angles are calculated based on the regions each partitioned by the image region partition part, and the skew angle is detected based on the plural angles.

21. An image processing method that generates binary image data from inputted image data, and detects a skew angle of the inputted image data based on the binary image data generated, the method comprising the steps of:

executing Hough transform to the binary image data to generate Hough space data;

executing a specific calculation to each of frequencies of a coordinate that represents distance and angle in the Hough space data;

tallying the attained calculation result by each angle;

generating first frequency calculation data based on the tallied result; and calculating skew angle based on the first frequency calculation data, wherein at least two maximum values or maximal values are detected from the first frequency calculation data, and when an angle from a difference of the angles that give the maximum values or the maximal values is about π/2 (rad), one of the angles is detected as the skew angle.

22. The image processing method according to claim 21, further comprising the steps of:

executing a binarization process to the inputted image data to generate the binary image data;

extracting a pixel block from the binary image data generated;

extracting a representative point of the extracted pixel block; and calculating a skew angle based on the binary image data of the representative point of the extracted pixel block.

23. A recording medium readable by a computer, the recording medium storing a program of instructions executable by the computer to perform a function for image processing, the function comprising the steps of:

executing Hough transform to the binary image data to generate Hough space data;

executing a specific calculation to each of frequencies of a coordinate that represents distance and angle in the Hough space data;

tallying the attained calculation result by each angle generating first frequency calculation data based on the tallied result; and calculating a skew angle based on the first frequency calculation data, wherein at least two maximum values or maximal values are detected from the first frequency calculation data, and when an angle from a difference of the angles that give the maximum values or the maximal values is about $\pi/2$ (rad), one of the angles is detected as the skew angle.

* * * * *